US011374867B2

(12) United States Patent
Edalat et al.

(10) Patent No.: US 11,374,867 B2
(45) Date of Patent: Jun. 28, 2022

(54) DYNAMIC TUNING OF CONTENTION WINDOWS IN COMPUTER NETWORKS

(71) Applicant: The Regents of the University of California, Oakland, CA (US)

(72) Inventors: Yalda Edalat, Santa Cruz, CA (US); Katia Obraczka, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/891,865

(22) Filed: Jun. 3, 2020

(65) Prior Publication Data
US 2020/0382425 A1 Dec. 3, 2020

Related U.S. Application Data

(60) Provisional application No. 62/856,521, filed on Jun. 3, 2019.

(51) Int. Cl.
| | |
|---|---|
| *H04L 12/801* | (2013.01) |
| *H04W 28/02* | (2009.01) |
| *H04L 47/283* | (2022.01) |
| *H04L 43/0852* | (2022.01) |
| *H04L 47/32* | (2022.01) |
| *H04L 47/2416* | (2022.01) |
| *H04L 12/841* | (2013.01) |

(52) U.S. Cl.
CPC .......... *H04L 47/14* (2013.01); *H04L 43/0852* (2013.01); *H04L 47/2416* (2013.01); *H04L 47/283* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 10,142,079 B2 * | 11/2018 | Oh | H04W 74/0808 |
| 2012/0275334 A1 * | 11/2012 | Hamada | H04W 74/085 370/252 |

(Continued)

OTHER PUBLICATIONS

Albalt, et al., Adaptive backoff algorithm for IEEE 802.11 MAC protocol, International Journal of Communications, Network and System Sciences, 2009, pp. 300-317.

(Continued)

*Primary Examiner* — Eunsook Choi
(74) *Attorney, Agent, or Firm* — Wolter Van Dyke Davis, PLLC; Eugene Molinelli

(57) ABSTRACT

Techniques for avoiding packet collision in wireless communications networks include initializing a first data indicating a plurality of fixed delay values in a range from a minimum delay to a maximum delay and indicating a corresponding plurality of adjustable weights. A first applied delay for a first packet is determined based on the first data. The first packet if transmitted at a time based on the first applied delay. Based on whether transmission of the first packet was successful the first data is adjusted by reducing a first weight of the plurality of adjustable weights for a corresponding first fixed delay value greater than the first applied delay, or by increasing a second weight of the plurality of adjustable weights for a corresponding second fixed delay value smaller than the first applied delay, or both.

31 Claims, 11 Drawing Sheets

(56) References Cited

U.S. PATENT DOCUMENTS

| | | | | |
|---|---|---|---|---|
| 2015/0016437 A1* | 1/2015 | Wentink | ............... | H04W 74/08 370/338 |
| 2020/0205199 A1* | 6/2020 | Newman | ............... | H04L 1/1812 |
| 2020/0244403 A1* | 7/2020 | Talarico | .................. | H04L 1/008 |
| 2021/0014894 A1* | 1/2021 | Li | ..................... | H04W 72/1289 |

OTHER PUBLICATIONS

Almotair, Inverse binary exponential backoff: Enhancing short-term fairness for IEEE 802. 11 networks, The Tenth International Symposium on Wireless Communication Systems, 2013. VDE, 1-5.

Bharghavan, et al., MACAW: a media access protocol for wireless LAN's. ACM SIGCOMM Computer Communication Review 24, 4, 1994, pp. 212-225.

Carneiro, NS-3: Network simulator 3. In UTM Lab Meeting Apr. 2010, vol. 20. 4-5.

Edalat, et al. Smart experts for network state estimation, IEEE Transactions on Network and Service Management 13, 3, 2016, pp. 622-635.

Edalat, et al., A machine learning approach for dynamic control of RTS/CTS in WLANs. In Proceedings of the 15th EAI International Conference on Mobile and Ubiquitous Systems: Computing, Networking and Services. ACM, 2018, 432-442.

Gannoune, A Non-linear Dynamic Tuning of the Minimum Contention Window (CW min) for Enhanced Service Differentiation in IEEE 802.11 ad-hoc Networks, In 2006 IEEE 63rd Vehicular Technology Conference, vol. 3. IEEE, 2006, pp. 1266-1271.

Helmbold, et al. Adaptive disk spin-down for mobile computers, Mobile Networks and Applications 5, 4, 2000, pp. 285-297.

Herbster, et al. Tracking the best expert, Machine Learning 32, 2, 1998, pp. 151-178.

Ki, et al., Performance Evaluation of Binary Negative-Exponential Backoff Algorithm in IEEE 802.11 WLAN. In International Conference on Mobile Ad-Hoc and Sensor Networks, 2006, pp. 294-303.

Ksentini, et al., Determinist contention window algorithm for IEEE 802.11. In 2005 IEEE 16th International Symposium on Personal, Indoor and Mobile Radio Communications, vol. 4. IEEE, 2005, pp. 2712-2716.

Nunes, et al., A machine learning framework for TCP roundtrip time estimation, EURASIP Journal on Wireless Communications and Networking, 2014, 1, 2014, 47.

Perkins, et al., Ad hoc on-demand distance vector (AODV) routing. Technical Report, 2003.

Shurman, et al., N-BEB: New backoff algorithm for IEEE 802.11 MAC protocol, In 2014 37th International Convention an Information and Communication Technology, Electronics and Microelectronics (MIPRO). IEEE, 2014, pp. 540-544.

* cited by examiner

DYNAMIC TUNING OF CONTENTION WINDOWS IN COMPUTER NETWORKS

CROSS-REFERENCE TO RELATED APPLICATIONS

This application claims benefit of Provisional Appln. 62/856,521, filed Jun. 3, 2019, the entire contents of which are hereby incorporated by reference as if fully set forth herein, under 35 U.S.C. § 119(e).

BACKGROUND

The exchange of information among nodes in a communications network is based upon the transmission of discrete packets of data from a transmitter to a receiver over a carrier according to one or more of many well-known, new or still developing protocols. In this context, a protocol consists of a set of rules defining how the nodes interact with each other based on information sent over the communication links.

Often, multiple nodes will transmit a packet at the same time and a collision occurs. During a collision, the packets are disrupted and become unintelligible to the other devices listening to the carrier activity. In addition to packet loss, network performance is greatly impacted. The delay introduced by the need to retransmit the packets cascades throughout the network to the other devices waiting to transmit over the carrier. Therefore, packet collision has a multiplicative effect that is detrimental to communications networks.

As a result, multiple international protocols have been developed to address packet collision, including collision detection and avoidance. Within the context of wired Ethernet networks, the issue of packet collision has been largely addressed by network protocols that try to detect a packet collision and then wait until the carrier is clear to retransmit. As an example, Ethernet networks use the Carrier Sensing Multiple Access/Collision Detection (CSMA/CD) protocol. Emphasis is placed in collision detection, i.e., a transmitting node can determine whether a collision has occurred by sensing the carrier.

On the other hand, the nature of wireless networks prevents wireless nodes from being able to detect a collision. This is the case, in part, because in wireless networks the nodes can send and receive but cannot sense packets traversing the carrier after the transmission has started. Another problem arises when two transmitting nodes are out of range of each other, but the receiving node is within range of both. In this case, a transmitting node cannot sense another transmitting node that is out of communications range. Therefore, protocols in wireless networks focus on collision avoidance. As an example, the IEEE 802.11 protocol, also known as WiFi, specifies two types of protocols, namely the Distributed Coordination Function (DCF) and the Point Coordination Function (PCF). DCF is IEEE 802.11's most widely used medium access mechanism and uses the Carrier Sensing Multiple Access/Collision Avoidance (CSMA/CA) protocol. CSMA/CA arbitrates access to the shared communication medium using a contention-based, on-demand distributed mechanism. One of the key components of IEEE 802.11's DCF is the Binary Exponential Back-off (BEB) algorithm which was introduced to mitigate channel contention and prevent collisions of packets simultaneously transmitted by multiple stations. In CSMA/CA, a transmitting node listens to the carrier for any other traffic and if the carrier is idle then it transmits the packet in its entirety. Then, the transmitting node waits for acknowledgement message from the intended receiving node. If no acknowledgment is received, the transmitting node assumes that a collision has occurred.

At this point, the node enters a period determined by the BEB algorithm. The BEB delays the retransmission of a collided packet by a random time, chosen uniformly over n slots (n>1), where n is a parameter called a Contention Window, or (CW). The process is as follows: CW is initially set based on a pre-specified minimum value, (CWmin). If a collision happens, the node chooses an exponentially increased CW until it reaches a prespecified maximum value (CWmax). As such, CW can significantly impact IEEE 802.11 performance. It will be noted that choosing small CW values may result in more collisions and back-offs. On the other hand, choosing large CW may result in unnecessary idle airtime and additional delay. In either case, the carrier is not used efficiently.

The work disclosed by the prior art varies on its approach to determining an appropriate CW. Some have focused in increasing CW linearly by adding CWmin to the current CW value in case of unsuccessful transmissions and decreases CW by 1 when transmissions are successful. Others focus on optimizing the values of CWmin and CWmax. For instance, a prior art disclosure increases both upper and lower bound of CW. The range of [CWmin, CWmax] is split into sub-ranges where each sub-range is assigned to a contentions stage. The contentions stage is initially 1 and with each collision, it is increased by 1. With each successful transmission, contention's stage goes back to stage 1.

SUMMARY

The original BEB algorithm presents several drawbacks, including, for example, fairness. Re-setting CW to its initial range after each successful transmission may cause the node who succeeds in transmitting to dominate the channel for an arbitrarily long period of time. As a result, other nodes may suffer from severe short-term unfairness. Also, the current state of the network (e.g., load) should be taken in account to select the most appropriate back-off range.

Based on the foregoing, a need is here recognized for an objective approach to determining contention windows that minimize back-off time and maximize network performance. In general, there is a need for techniques to recognize network patterns and determine contention windows that are responsive to those network patterns. Thus, techniques are provided for avoiding packet collisions and improving protocol fairness in a communications network by determining contention windows based on past network patterns.

In a first set of embodiments, a method is implemented on the processor of a node in a wireless communications network for avoiding packet collisions amongst simultaneously transmitting nodes. The method includes initializing first data indicating multiple fixed delay values and a corresponding multiple adjustable weights. The fixed delay values are in a range from a minimum delay to a maximum delay. The method further includes determining a first contention window for a first packet based on the first data and then transmitting the first packet at a time based on the first contention window. The method also includes adjusting the first data by adjusting at least one weight of the first data based on whether transmission of the first packet was successful. In some of these embodiments, the method includes determining a second contention window for a second packet based on the adjusted first data and transmitting the second packet at a time based on the second contention window. In some of these embodiments, the first data is adjusted to incrementally promote shorter delay times when transmission of the first packet is successful and incrementally promote longer delay times when transmission of the first packet is not successful.

In some embodiments of the first set in which weights indicate a probability of selecting a fixed delay, if the transmission is successful, the method adjusts the data by either reducing a first weight of the plurality of adjustable weights for a corresponding first fixed delay value greater than the first contention window, or by increasing a second weight of the plurality of adjustable weights for a corresponding second fixed delay value smaller than the first contention window, or both. In some of these embodiments, reducing the first weight further includes reducing the first weight proportionally to a difference between the first contention window and the first fixed delay value. In some other embodiments, increasing the second weight further includes increasing the second weight proportionally to a difference between the first contention window and the second fixed delay value.

In some embodiments of the first set, if the transmission is unsuccessful, the method adjusts the data by either increasing a first weight of the plurality of adjustable weights for a corresponding first fixed delay value greater than the first contention window, or by decreasing a second weight of the plurality of adjustable weights for a corresponding second fixed delay value smaller than the first contention window, or both. In some of these embodiments, increasing the first weight further includes increasing the first weight proportionally to a difference between the first contention window and the first fixed delay value. In some embodiments, decreasing the second weight further includes decreasing the second weight proportionally to a difference between the first contention window and the second fixed delay value.

In some embodiments of the first set, the method includes initializing each weight of the plurality of adjustable weights equal to a same default weight. In some of these embodiments, the same default weight is an inverse of a number of adjustable weights in the plurality of adjustable weights. Yet, in some embodiments of the first set, the plurality of fixed values forms a geometric sequence. In some of these embodiments the geometric sequence is incremented by a factor of 1.5.

In some embodiments of the first set, the plurality of fixed delay values may indicate slots for a Distributed Coordination Function used by an IEEE 802.11 (WiFi) standard and the minimum delay is a minimum contention window and the maximum delay is a maximum contention window.

In other sets of embodiments, a computer-readable medium or apparatus is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1A:
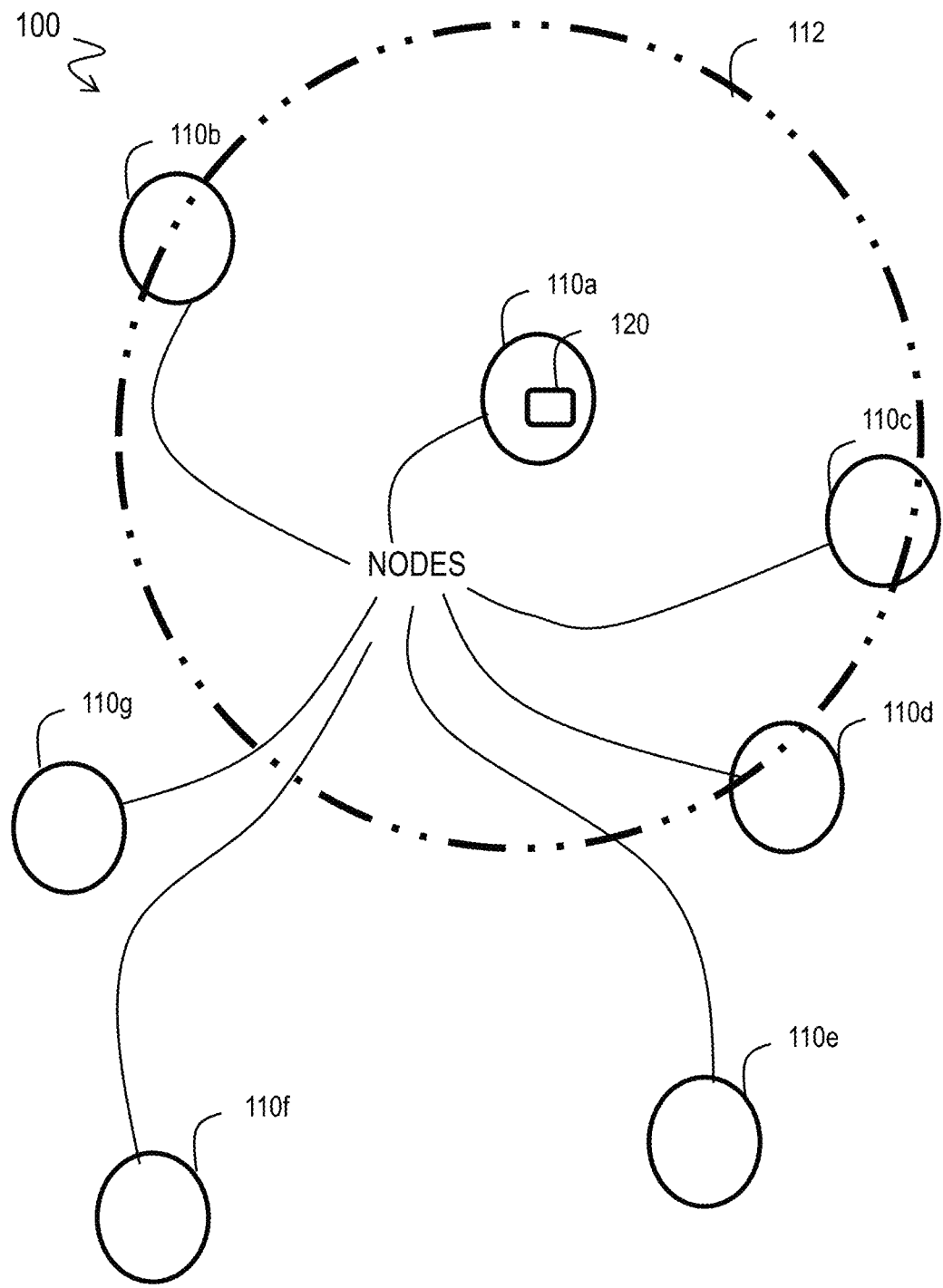
FIG. 1A is a block diagram that illustrates an example wireless communications network, according to an embodiment.

Techniques are described for determining one or more contention window delays based on expert delays and adjustable weights to avoid packet collisions in a communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of packet collision avoidance in the IEEE 802.11 standard. However, the invention is not limited to this context. In other embodiments, the methods disclosed herein may be applied to infrastructure-less networks, such as mobile ad hoc networks (MANETs) and wireless multi-hop ad hoc networks. In other embodiments, methods disclosed herein may be applied to other network protocols/ services that use parameters that need to reflect current network/system conditions. As an example, methods disclosed herein may be applied without limitation to estimating one-way or round-trip times, setting route cache invalidation times, estimating link stability, and estimating MAC sleep schedules. Although the term contention window is used in some specific embodiments to mean a number n of slots, the term contention window is used herein interchangeably with the term collision back-off time or delay or fixed delay or expert delay to indicate any method of determining one or more time delays for transmitting a packet to avoid packet collisions on a share channel.

1. Overview

FIG. 1A is a block diagram that illustrates an example wireless ad hoc communications network 100, according to an embodiment. Wireless nodes 110a, 110b, 110c, 110d, 110e, 110f, 110g, among others, not shown, represented as circles and collectively referenced hereinafter as nodes 110, are assembled in space and move in and out of communication range of each other. Communication range 112 is represented as a double dot dash circle around node 110a. Nodes transmitting in communication range of each other may transmit packets simultaneously thereby creating packet collisions. Similar problems arise when two transmitting nodes (e.g., nodes 110b and 110d) are not within range of each other, but the receiving node (e.g., 110a) is within range of both. When the two nodes 110b and 110d transmit simultaneously a collision occurs at the receiving node 110a.

According to various embodiments, each node 110 includes a collision avoidance module 120 configured to cause the nodes 110 to adaptively learn collision back-off times that succeed in a given network. Each module 120 maintains a contention window data structure in a computer-readable medium, such as in computer memory or storage, described in more detail below with reference to FIG. 10.

Figure 1B:
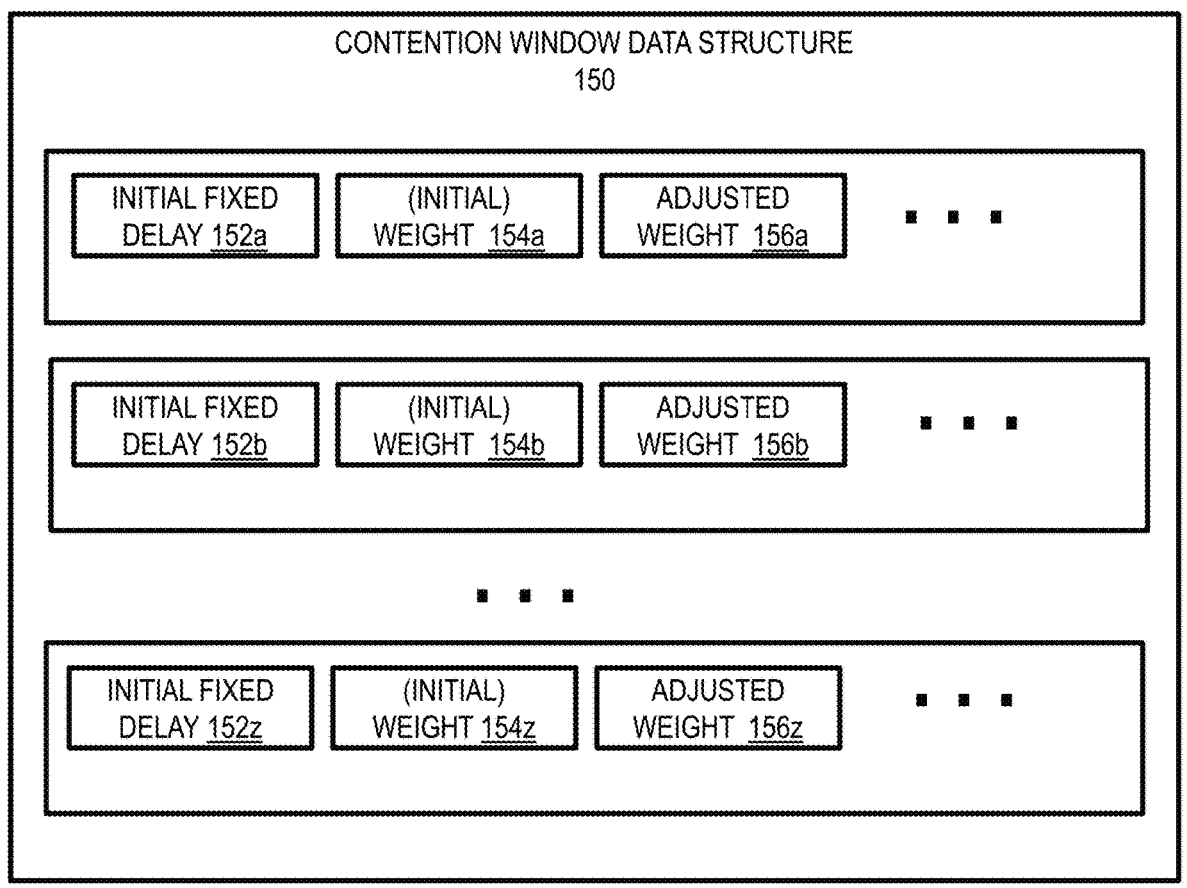
FIG. 1B is a block diagram that illustrates an example contention window data structure, according to an embodiment.

FIG. 1B is a block diagram that illustrates an example contention window data structure 150, according to an embodiment. The contention window data structure 150 includes multiple records 151a, 151b among other indicated by ellipses, and ending with a last record 151z, collectively referenced herein as records 151. Each record 151 includes an initial fixed delay field 152a, 152b, through 152z, respectively, collectively referenced hereinafter as initial fixed delay field 152. Each initial fixed delay field holds data that indicates a time for sending a packet after a previous transmission, either sending a new packet or sending again a packet that was not successfully sent, e.g., due to a collision, as detected, for example, by the failure to receive an acknowledgement message within a specified time. For example, the field 152 holds data that indicates one slot in a protocol that uses a set of predetermined time slots to avoid collisions. In other embodiments, the field holds data that indicates a time in seconds or number of clock cycles after which a packet can be transmitted. In various embodiments, the delays are called wait times, re-transmission slots, expert delays, back-off times, contention windows, etc. The fields 152 span a delay from some minimum delay slot/time/cycle to transmit in field 152a, to some maximum delay slot/time/cycle to transmit in field 152z, as set by a particular protocol. In some embodiments each successive record holds an expert delay (e.g., in field 152b of record 151b) that is a fixed increment above the expert delay of the previous record (e.g., in field 152a of record 151a). In some embodiments each successive record holds an expert delay (e.g., in field 152b of record 151b) that is a geometrically growing increment above the expert delay of the previous record (e.g., in field 152a of record 151a), e.g., by a factor of 1.5, or exponentially growing, e.g., by an exponent of 2. In some embodiments, the number of records is fixed; and, in some embodiments the number of records can increase or decrease.

Each record 151 also includes a corresponding weight field 154a, 154b, through 154z, respectively, collectively referenced hereinafter as weight field 154, which, at least initially, includes a value that indicates how to use the value indicated in a corresponding field 152. In some embodiments, the value in weight field 154 is used as a multiplication factor to multiply the value in the corresponding fixed delay field 152. In other embodiments the value in weight field 154 is used as an additive factor to add or subtract from the value in the corresponding delay field 152. In some embodiments, the value in weight field 154 is used as a probability to affect the selection of the value in the corresponding delay field 152 and the sum of the values in all fields 154 is 1 (100%). In some embodiments, a delay to be applied is a weighted sum of all the delays in all records, as given by Equation 1 In some of these embodiments, if there are n records 151, then the value in each weight field 154 is initially 1/n, so that each fixed delay is equally probable or has equal weight.

Applied Delay=sum for $i=1$ to $n$ of delay $i$×weight $i$. (1)

In various embodiments, the values in the weight fields 154 are adjusted based on experienced transmission failure. In some embodiments, the adjusted values replace the values originally in fields 154 and no additional weight fields are included in each record 151. However, in some embodiments, the adjusted values are stored in a second weight field and field 154 is called, optionally, an initial weight field 154, and the new field is called an adjusted weight field, such as adjusted weight fields 156a, 156b, through 156z, respectively, and collectively referenced hereinafter as adjusted weight field 156. In some embodiments, each record 151 includes additional weight fields, indicated by ellipses, for one or more weights to use in other or special circumstances.

In various embodiments, as a node experiences collisions during attempted transmissions, the weights in fields 154 (or 156) are adjusted, rather than the fixed delays in fields 152, to increase the average delay, while still maintaining some randomness between different nodes; and, as nodes experience greater success in transmissions, the weight in fields 154 (or 156) are adjusted, again rather than the fixed delay in field 152s, to decrease the average delay, while still maintaining some randomness between different nodes. Thus, in such embodiments, the contention window data structure values are adjusted to incrementally promote shorter delay times when transmission of the first packet is successful and incrementally promote longer delay times when transmission of the first packet is not successful. By making incremental adjustments, recent past transmission performance, not just immediate past transmission performance, influences an applied delay.

Although nodes, module, data structures and fields are shown in FIG. 1A and FIG. 1B as integral blocks in a particular arrangement for purposes of illustration, in other embodiments, more or fewer nodes or modules or data structures or fields, or portions thereof, are included or are provided in a different arrangement, or some combination.

Figure 2:
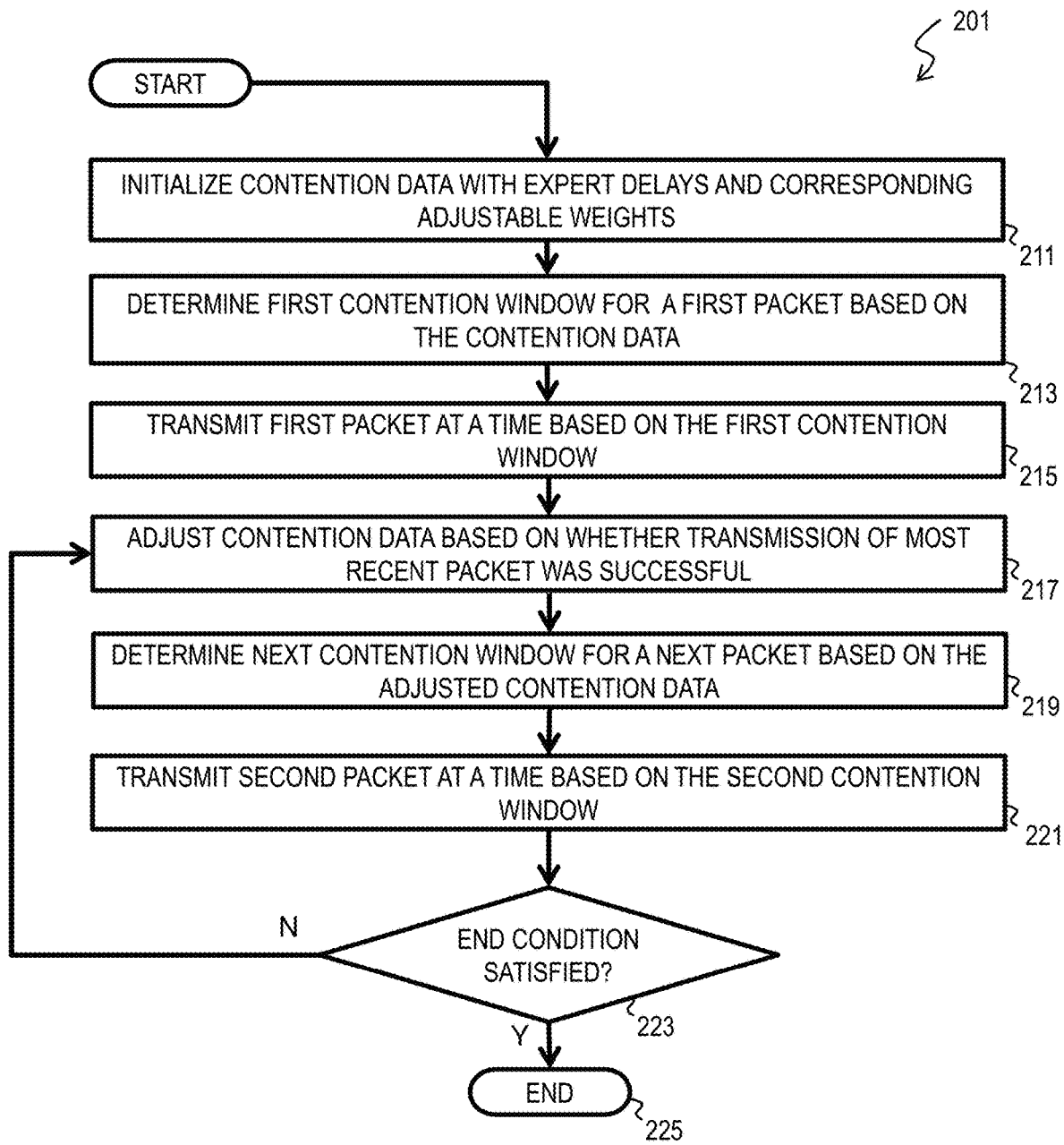
FIG. 2 is a flow chart that illustrates an example method for determining a contention window to avoid packet collisions in a communications network, according to an embodiment.

FIG. 2 is a flow chart that illustrates an example method for determining a contention window to avoid packet collisions in a communications network, according to an embodiment. Although steps are depicted in FIG. 2, and in subsequent flowchart FIG. 3, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 211, the method initializes contention data by setting fixed delays (also called expert delays for reasons that will be explained in the example section) and corresponding adjustable weights, e.g., in data structure 150. It may be appreciated, that in some embodiments the expert delays may be fixed delay values. In other embodiments, the fixed delay values may be predetermined wait times or slots available for retransmission after a packet collision has occurred. In some embodiments, each expert delay has at least one adjustable weight. Yet, in some embodiments, each expert delay may have more than one adjustable weight and each adjustable weight corresponding to the same expert delay may be adjusted independently of the others.

As a non-limiting example, the expert delays correspond to predetermined wait times for retransmission after a collision has occurred. As another non-limiting example, in the IEEE 802.11 protocol (also known as WiFi) the expert delays may correspond to pre-defined contention windows between CWmin and CWmax. In some of these embodiments the number of records is equal to CWmax; and in some of these embodiments, the weights for all records above the record equal to CWmin are set initially to zero. In other embodiments, the expert delays may be selected using a geometric sequence. In some embodiments, the adjustable weights are selected initially by assigning the same value to all the adjustable weights. As an example, each adjustable weight may be initialized to 1/n where n equals the total number of expert delays.

Next, in step 213, the method determines, based on the contention data, a first record 151 holding data for a first contention window for a first packet to be transmitted. The first record may be determined by selecting from the most desirable expert delay after modulating each expert delay by its corresponding adjustable weight. As a non-limiting example, the expert delays are multiplied by the corresponding adjustable weights and then the record with a larger fixed time closest to the adjusted expert delay is selected. In some other embodiments, the first record is determined by selecting an expert delay that meets a predefined criterion. As an example, the predefined criterion may be a threshold or a distribution of probabilities; e.g., the record 151 with the largest probability in weight field 154 or in adjusted weigh field 156 is selected.

In step, 215, the method waits until the time indicated in the first record or the first weighted sum, based on the values in the fixed delay field 152 and weight field 154 (or 156), and then transmits the packet. Then, in step 217, the contention data is adjusted. In an embodiment, the contention data is adjusted depending on whether the transmission was successful or not. In an embodiment, the contention data may be adjusted by selecting a different record with a different expert delay and setting new corresponding adjustable weights. In yet another embodiment, the contention data may be adjusted by retaining the previous expert delays and adjusting the corresponding adjustable weight or weights in the same record. For example, the values in fields 154 or 156 of the contention window data structure 150 are adjusted to incrementally promote shorter delay times when transmission of the first packet is successful and incrementally promote longer delay times when transmission of the first packet is not successful.

In step 219, the method determines a next contention window for a next packet based on the adjusted contention data of step 217. The method waits until the next contention window and transmits the next packet in step 221. If an end condition is satisfied in step 223 then the method 201 ends in step 225. If the end condition is not satisfied, then the method continues to step 217 and re-adjusts the contention data. As an example, the end condition may be that there are no more packets to be sent; or, may be that the method is awaiting an external input to re-adjust the contention data. If the end condition is not satisfied in step 223, then the method returns to step 217 and readjusts the contention data.

Figure 3:
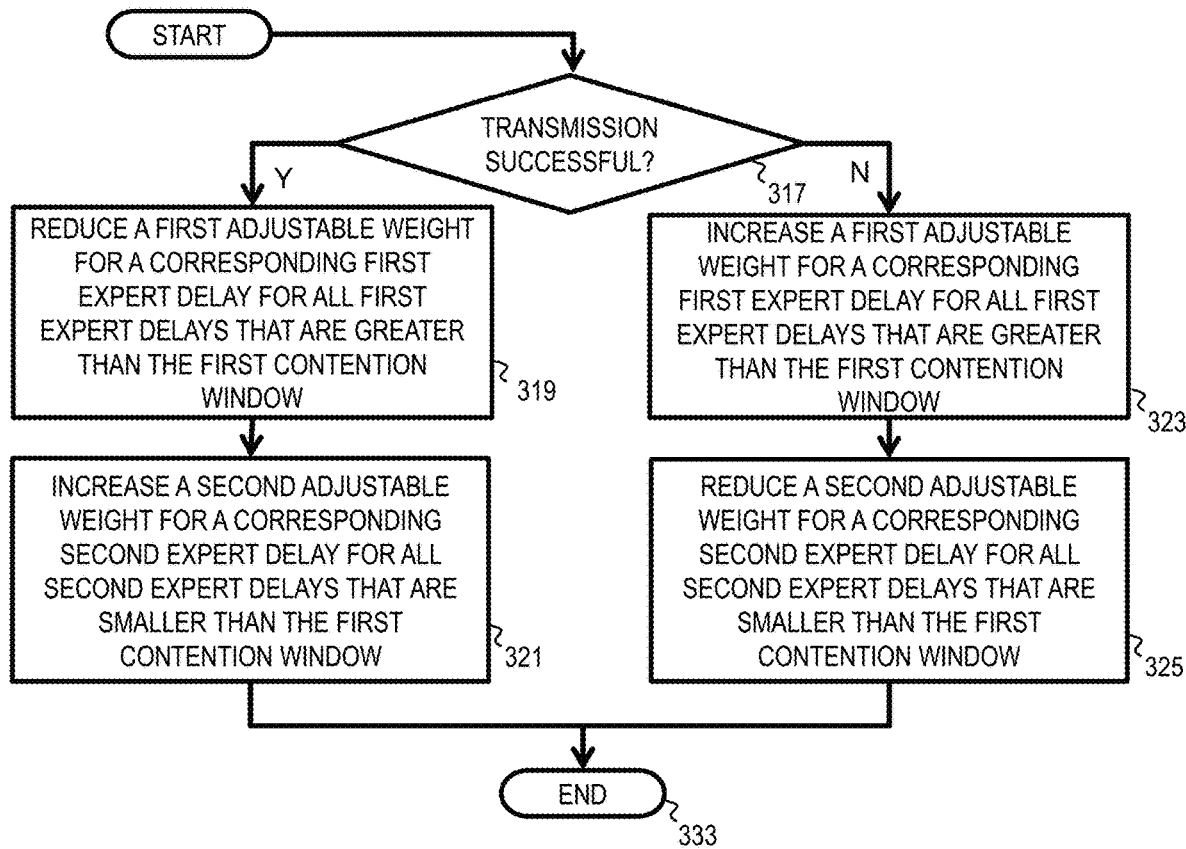
FIG. 3 is a flow chart that illustrates an example embodiment of adjusting the contention data based on whether the transmission was successful, as in step 2178 of FIG. 2, according to an embodiment.

FIG. 3 is a flow chart that illustrates an example embodiment of adjusting the contention data based on whether the transmission was successful, as in step 217 of FIG. 2, according to an embodiment. In this embodiment, the adjustable weights in field 154 (or 156) each indicates the probability of selecting the corresponding fixed delay in field 152 for the same record 151, or, alternatively, indicates the weight for a weighted sum of all the fixed delays.

In step 317, the method determines whether the transmission was successful. As an example, the determination of whether the transmission was successful may be based on an acknowledgement message received by the transmitting node from the intended recipient of the first packet within a predefined acknowledgement receipt time.

If the transmission is successful, then, in step 319, a first adjustable weight is reduced, which corresponds to each of at least one of first expert delays where each first expert delay is greater than the first contention window or applied delay of step 215 in FIG. 2. As an example, the method reduces the values of each of the first adjustable weights proportionally to the difference between the first expert delays and the applied delay for all first expert delays that are greater than the first applied delay.

Next, in step 321, a second adjustable weight is increased, which corresponds to each of at least one of a second expert delay where each second expert delay is smaller than the first contention window or applied delay of step 215 in FIG. 2.

As an example, the method increases the values of each of the second adjustable weights proportionally to the difference between the applied delay and each of the second expert delays for all second expert delays that are smaller than the first applied delay.

If the transmission is unsuccessful in step 317, then, in step 323, a first adjustable weight is increased, which corresponds to each first expert delay where each first expert delay is greater than the first contention window or applied delay of step 215 in FIG. 2. As an example, the method increases the values of each of the first adjustable weights proportionally to the difference between the first expert delays and the applied delay for all first expert delays that are greater than the first applied delay.

Next, in step 325, a second adjustable weight, is decreased, which corresponds to each of at least one of a second expert delay where each second expert delay is smaller than the first contention window or applied delay of step 215 in FIG. 2. As an example, the method reduces each of the probabilities of the second adjustable weights proportionally to the difference between the applied delay and each of the second expert delays for all second expert delays that are smaller than the first applied delay.

Thus, is introduced an enhanced machine learning (ML) based contention window adaptation approach. As the complexity and heterogeneity of networks and their applications grow, the use of ML techniques to adequately manage network in order to meet application requirements becomes increasingly attractive for a number of reasons. For instance, machine learning algorithms can learn and adapt to network and application dynamics autonomically. Some ML techniques do not require a priori knowledge of the operating environment; they acquire this knowledge as they operate and adjust accordingly without needing complex mathematical models of the system. The techniques disclosed herein for one embodiment are believed to be the first to use ML to automatically adjust IEEE 802.11 contention windows (CW) based on packet transmission history. It is here noted that one advantage of these techniques is that they achieve significant performance gains, yet are simple, low cost, low overhead, and easy to implement.

2. Example Embodiments

An example embodiment of a method to dynamically tune the contention window size of IEEE 802.11's Distributed Coordination Function and performance thereof is worked out in detail with a variety of different conditions in this section. The statements made in this section apply only to the embodiments described herein. In addition, simulations show that this embodiment of the method is more efficient than previous approaches, even more than previous approaches using the Binary Exponential Back-off (BEB) algorithm currently favored for IEEE 802.11 protocols.

Some of the techniques described herein are based on recognizing how to apply a Fixed-Share Experts algorithm [8] to tune IEEE 802.11 contention windows (CW). A brief description of the Fixed-Share algorithm is described first. The Fixed-Share algorithm is part of the Multiplicative Weight algorithmic family which was shown to yield performance improvements in a variety of on-line problems [8], [12]. This family of algorithms combines predictions of a set of experts $\{x_1, x_2, \ldots, x_N\}$ to calculate the overall prediction denoted by $\hat{y}_t$. Each expert has a weight $\{w_1, w_2, \ldots, w_N\}$ representing the impact of that expert on the overall predictor. Based on the difference between each expert's prediction and the real data represented by $y_t$, the weight of each expert is updated [5]. Algorithm 1 shows Fixed-Share Experts' pseudo-code.

---

Algorithm 1 Fixed-Share Algorithm

Parameters:

$$\eta > 0, 0 \leq \alpha \leq 1$$

Intialization:

$$w_{1,1} = \ldots = w_{N,1} = \frac{1}{N}$$

Prediction:

$$\hat{y}_t = \frac{\sum_1^N w_{i,t} \times x_i}{\sum_1^N w_{i,t}}$$

Loss Function:

$$L_{i,t}(x_i, y_t) = \begin{cases} (x_i - y_t)^2, & x_i \geq y_t \\ 2 \times y_t, & x_i < y_t \end{cases}$$

Exponential Update:

$$\acute{w}_{i,t} = w_{i,t} \times e^{-\eta \times L_{i,t}(x_i, y_t)}$$

Sharing Weights:

$$\text{Pool} = \Sigma_{i=1}^N \alpha \times \acute{w}_{i,t}$$

$$w_{i,t+1} = (1 - \alpha) \times \acute{w}_{i,t} + \frac{1}{N} \times \text{Pool}$$

---

Each expert is initialized with a value within the range of the quantity to be predicted and the weight of all experts is initialized to 1/N, where N is the number of experts. At every iteration, based on each expert's current weight and value, the prediction for the next trial is calculated as shown in the Prediction step of the algorithm. The Loss Function step then checks how good the prediction of each expert was using a loss function $L_{i,t}(x_i, y_t)$. The result of the loss function is computed loss for each expert; and, is used in the Exponential Update step to adjust the experts' weights by multiplying the current weight of the ith expert by $\exp(-\eta \times L_{i,t}(x_i, y_t))$. The learning rate $\eta$ is used to determine how fast the updates will take effect, dictating how rapidly the weights of misleading experts will be reduced, thus considering recent history longer than just the immediately preceeding result Finally, in the SharingWeights step, a fixed fraction of the weights of experts that are performing well is shared among the other experts. The goal of this step is to prevent large differences among experts' weights [9]. The amount of sharing can be adjusted through the sharing rate parameter $\alpha$.

An example embodiment (using a so called "proposed algorithm") uses a modified version of the Fixed-Share algorithm to dynamically set IEEE 802.11 CW as illustrated in Algorithm 2, by recognizing that the set of possible delays, the fixed delays, correspond to the predictions of experts in the shared expert algorithm, and thus should be given weights based on performance.

---

Algorithm 2 Proposed Algorithm

Intialization:

$$w_{1,1} = \ldots = w_{N,1} = \frac{1}{N}$$

-continued

Algorithm 2 Proposed Algorithm $x_1 = CW_1, x_2 = CW_2, \ldots, x_N = CW_N.$

CW Calculation:

$$C\hat{W}_t = \left\lfloor \frac{\sum_1^N w_{i,t} \times x_i}{\sum_1^N w_{i,t}} \right\rfloor$$

Loss/Gain Function:
If packet received successfully:

$$w_{i,t+1} = \begin{cases} \left[1 - \frac{x_i - C\hat{W}_t}{x_i}\right] \times w_{i,t}, & x_i > C\hat{W}_t \\ \left[1 + \frac{x_i}{C\hat{W}_t}\right] \times w_{i,t}, & x_i \leq C\hat{W}_t \end{cases}$$

If packet is not received successfully:

$$w_{i,t+1} = \begin{cases} \left[1 + \frac{C\hat{W}_t}{x_i}\right] \times w_{i,t}, & x_i > C\hat{W}_t \\ \left[1 - \frac{C\hat{W}_t - x_i}{C\hat{W}_t}\right] \times w_{i,t}, & x_i \leq C\hat{W}_t \end{cases}$$

Sharing Weights:

$Pool = \Sigma_{i=1}^N \alpha \times \dot{w}_{i,t}$ $w_{i,t+1} = (1-\alpha) \times \dot{w}'_{i,t} + \frac{1}{n} \times Pool$ Here loss and gain functions are designed to account for current network conditions as reflected in recent packet transmission successes and failures. Similarly to the standard Fixed-Share algorithm (Algorithm 1), in the Initialization step in Algorithm 2, the weight of all experts is set to 1/N, where N is the number of experts, such as a preferred set of delay times or contention slots, collectively called herein contention windows (CWs). Each expert is assigned a fixed value within a range from a minimum to a maximum sized CW, designated, respectively CWmin, CWmax. For example, in an experimental embodiment, the CWi values of 15, 22, 33, 50, 75, 113, 170, 256, 384, 576, 865, and 1023 are assigned to i=1 to N=12 experts, thus forming a geometric sequence with a ratio of 1.5 between successive experts. These values were selected to keep CWmin and CWmax unchanged according to the IEEE 802.11 standard, and to yield a less drastic geometric back-off process than the exponential back-off employed in the BEB adjustment, which is considered to be quite aggressive [3]. In addition, experiments with different numbers and values for CWi in various other embodiments did not yield significantly better performance than that achieved with the experimental embodiment described in this section.

In the CW Calculation step, $CW^{\wedge}_t$, which is CW estimate for time t, is calculated based on a weighted sum of the current value of the experts and their weights. Clearly, experts with more weight will have more influence on the next CW. In the Loss/Gain Function step, the performance of all experts is evaluated based on their value, $CW^{\wedge}_t$, and whether the previous packet transmission was successful or not.

The loss and gain functions are designed to adjust CW (applied delay) based on present network conditions as well as recent past network conditions. This loss/gain function works as follows: if a packet is transmitted successfully, it means that there may be additional bandwidth available in the network. Therefore, the weight is reduced for the expert delays higher than the applied delay, $CW^{\wedge}_t$, because they are less aggressive experts. Weight reduction is done proportional to the difference between the value of that expert delay and the applied delay which means the higher the expert delay is, the more aggressively its weight will be reduced. Also, the weight is increased for expert delays smaller than $CW^{\wedge}_t$ because it is advantageous to push for a potentially more aggressive CW. This weight increase is done proportional to the value of the expert delay or the difference between the value of that expert delay and the applied delay. Expert delays with value closer to the applied delay will experience higher weight increase. For the experts with value much lower than the applied delay, the risk of failure is higher, therefore their weight increase is lower. These weight decreases and increases for various expert delays will result in a lower value (shorter delay) for the next applied delay; and, as a result, the next transmission will be scheduled more aggressively.

Analogously, in the case of unsuccessful transmissions, the loss/gain function increase the weight of expert delays with values higher than $CW^{\wedge}_t$ and reduce the weight of expert delays with values lower than $CW^{\wedge}_t$. This will result in higher CW (longer delay) for the next packet transmission; and, less chance of collision.

The overhead incurred by Algorithm 2 is a function of the number of experts used. There is a cost-performance tradeoff between the number of experts and how well the algorithm can capture network dynamics. However, as previously discussed, there is a diminishing returns effect, wherein beyond a certain number of experts, there is minimal performance impact. As far as storage overhead, additional storage is used to keep the experts' values and their weights. As for computation overhead, assuming the contention window is adjusted at every attempted transmission, the CW Calculation, Loss/Gain Function, and Sharing Weights steps in Algorithm 2 are executed. These involve simple arithmetic operations and are not computationally onerous, which are consistent with developing a simple, light-weight algorithm that can run at line rate. Thus, in the experimental embodiment ("Proposed" method), the number of experts, N, is 12.

The performance of the experimental embodiment is tested in simulations, as described next. Various scenarios, traffic loads, and performance metrics are used when evaluating the experimental embodiment (the "Proposed" method) compared to both the original IEEE 802.11 contention window adjustment technique, BEB, as well as the History-Based Adaptive Back-off (HBAB) algorithm [1].

Experiments were run using an ns-3 network simulator [4] and its implementation of the IEEE 802.11n for both infrastructure-based and ad hoc network scenarios. In these simulations, topologies were used with 100 nodes randomly placed in a 1000×1000 square meter (m²) area. In order to vary network contention conditions, the number of sender nodes was varied. How the experimental embodiment is able to adjust dynamically to the contention window and its effect on network performance are explored. Table 1 summarizes the parameters and values describing the experimental embodiment setup. Note that AODV [13] routing was used only in the multi-hop ad hoc experiments.

TABLE 1

Simulation setup parameters and values.

| | |
|---|---|
| Area | 1000m × 1000m |
| Number of nodes | 100 |
| Traffic | CBR and real traces |
| IEEE 802.11 version | 802.11n |
| Number of experts (records 151) | 12 |
| CWmin | 15 |
| CWmax | 1023 |
| Routing protocol | AODV |

Traffic load to drive the simulations was based on synthetic data traces as well as traces collected in real networks. Table 2 summarizes the synthetic data parameters and their values. Real traffic traces were collected using a wireless sniffer in two different settings, namely: (1) a coffee shop public hot spot and (2) a company campus network (Table 3). Note that since there are 10 and 5 individual flows in the hot spot and company traces, respectively, these flows were replicated in scenarios with higher number of nodes.

TABLE 2

Synthetic trace.

| | |
|---|---|
| Simulation time | 200 seconds |
| Traffic type | Constant bit rate (CBR) |
| Packet frame size | 1024 bytes |
| Data rate | 54 million bits per second (Mbps) |

TABLE 3

Hot spot and company trace

| | Hot spot | Company |
|---|---|---|
| Location | Coffee shop | Company campus |
| Number of flows | 10 | 5 |
| Duration | 20 minutes | 30 minutes |
| Packet frame size | 34 bytes to 2150 bytes | 34 bytes to 11,000 bytes |
| 8021.11 version | 802.11n | 802.11n |

The experimental embodiment was evaluated by comparing its performance against the IEEE 802.11 original mechanism, BEB, as well as HBAB [1]. As performance metrics, average throughput and average end-to-end delay are used. Average throughput is calculated as follows. For each node, the number of bits received over the time of the experiment was measured and the average throughput achieved by each node was calculate. That value was averaged over all nodes in the experiment. Average end-to-end delay (in milliseconds, ms) is given by the interval of time between when a packet was received and when it was sent averaged over all received packets. Channel access fairness is an important issue in MAC protocol design. As such, fairness of the experimental embodiment was also evaluated by comparing its minimum, maximum, and average throughput against those of BEB and HBAB for IEEE 802.11, with smaller throughput variations among nodes considered more "fair."

History-Based Adaptive Back-off (HBAB) [1] increases or decreases the congestion window CW based on the current, as well as past, data transmission trials. HBAB defines two parameters $\alpha$ and $n$; $\alpha$ is a multiplicative factor used to update CW, and $n$ is the number of past transmission trials considered by the algorithm (different than the number of experts, N described above). The outcome of the previous $n$ transmission trials is stored. HBAB's original design presented in [1] is described only for $n=2$. The implementation of HBAB used herein does not use $n>2$ because HBAB's state space grows with $n$ which means that one would need to define "manually" how to adjust CW for all the possible outcomes of the previous $n$ transmissions, which is a subjective effort.

The experimental embodiment is evaluated using two types of scenarios, namely: infrastructure-based and infrastructure-less (or multi-hop ad hoc) networks. In all graphs, each data point is calculated by averaging over 10 runs that use different random seeds.

In the infrastructure-based experiments, randomly selected nodes send traffic to the Access Point (AP) which is placed in the center of the area being simulated. The experiments are driven using the synthetic and real (i.e., hot spot and company campus) traffic traces described above, varying the number of senders as follows: 3, 5, 10, 30, 50, and 100.

Figure 4A:
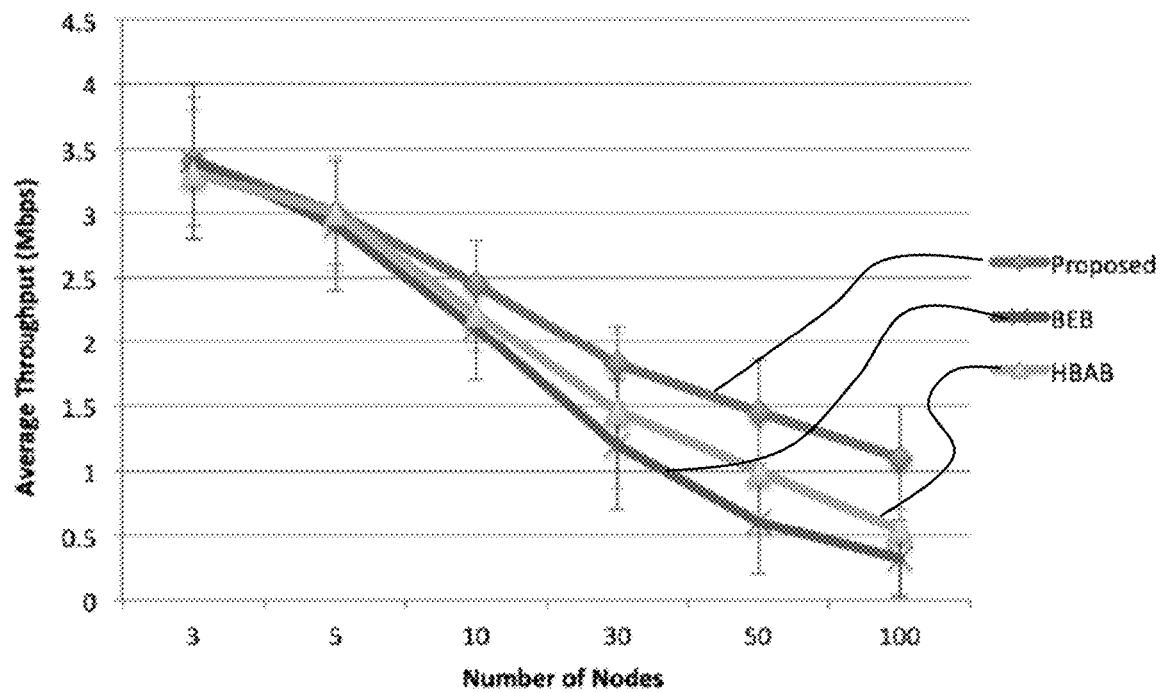
FIG. 4A and FIG. 4B are plots that compare example average throughput and delay, respectively, as a function of number of senders for hot-spot traffic trace in infrastructure-based scenario, according to an embodiment.
Figure 4B:
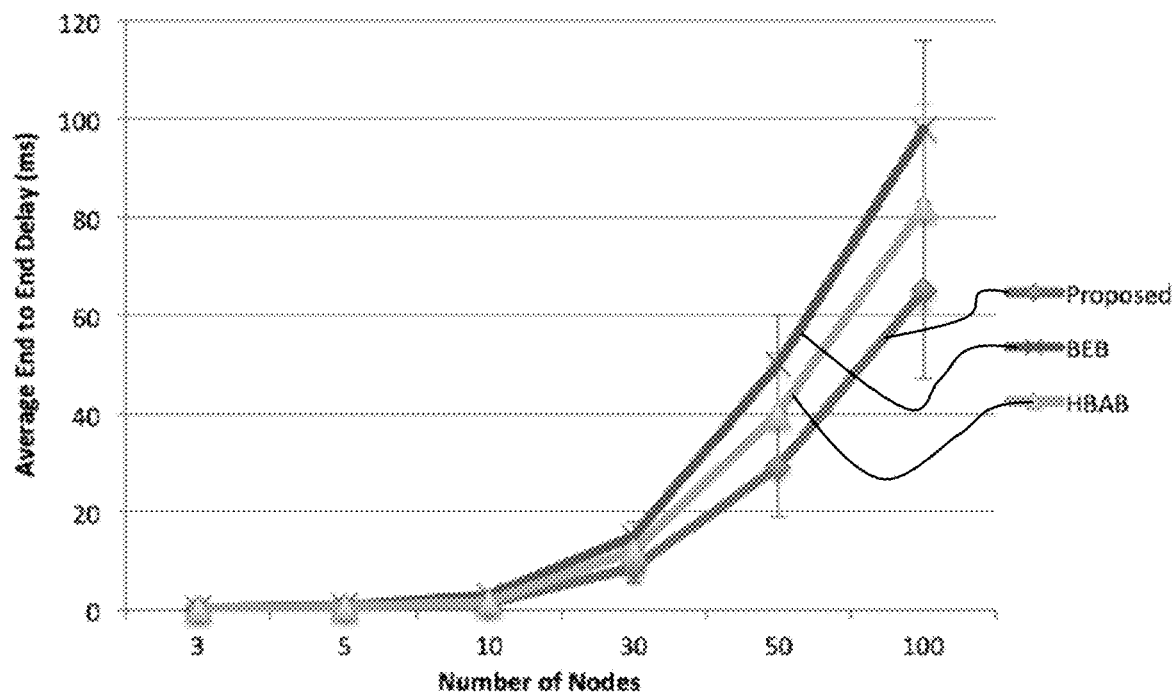
Figure 5A:
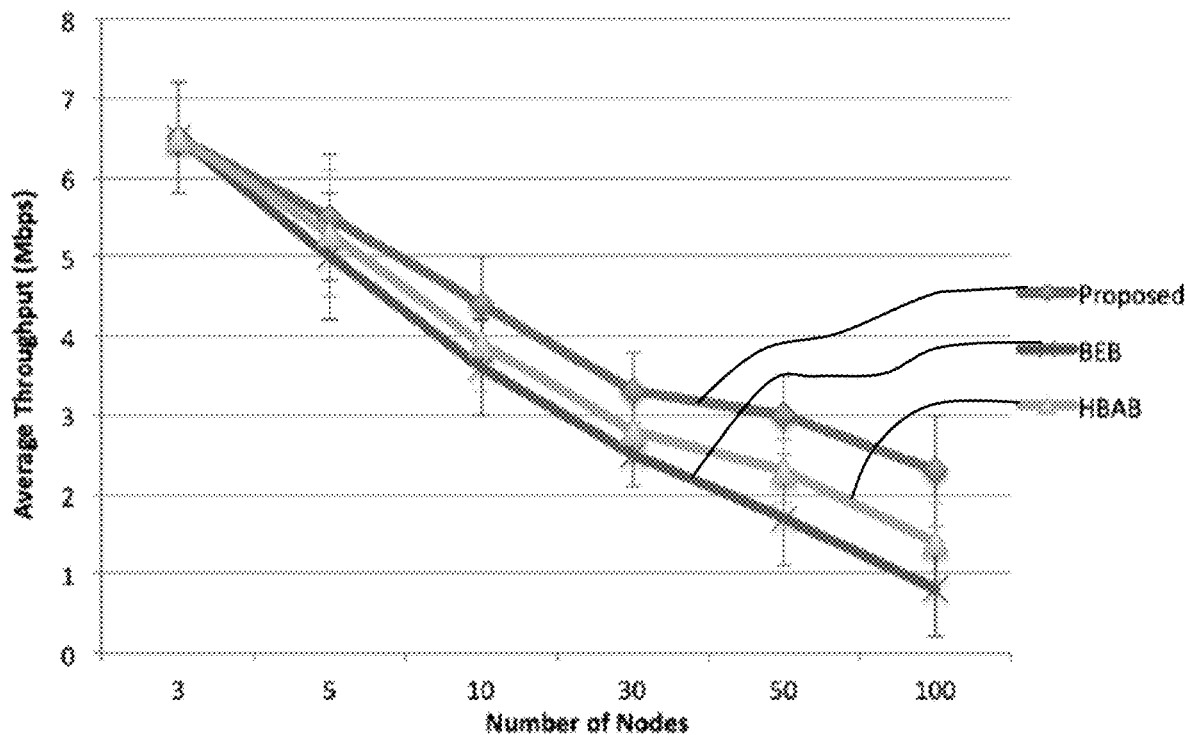
FIG. 5A and FIG. 5B are plots that compare example average throughput and delay, respectively, as a function of the number of senders for company campus traffic trace in infrastructure-based scenario, according to an embodiment.
Figure 5B:
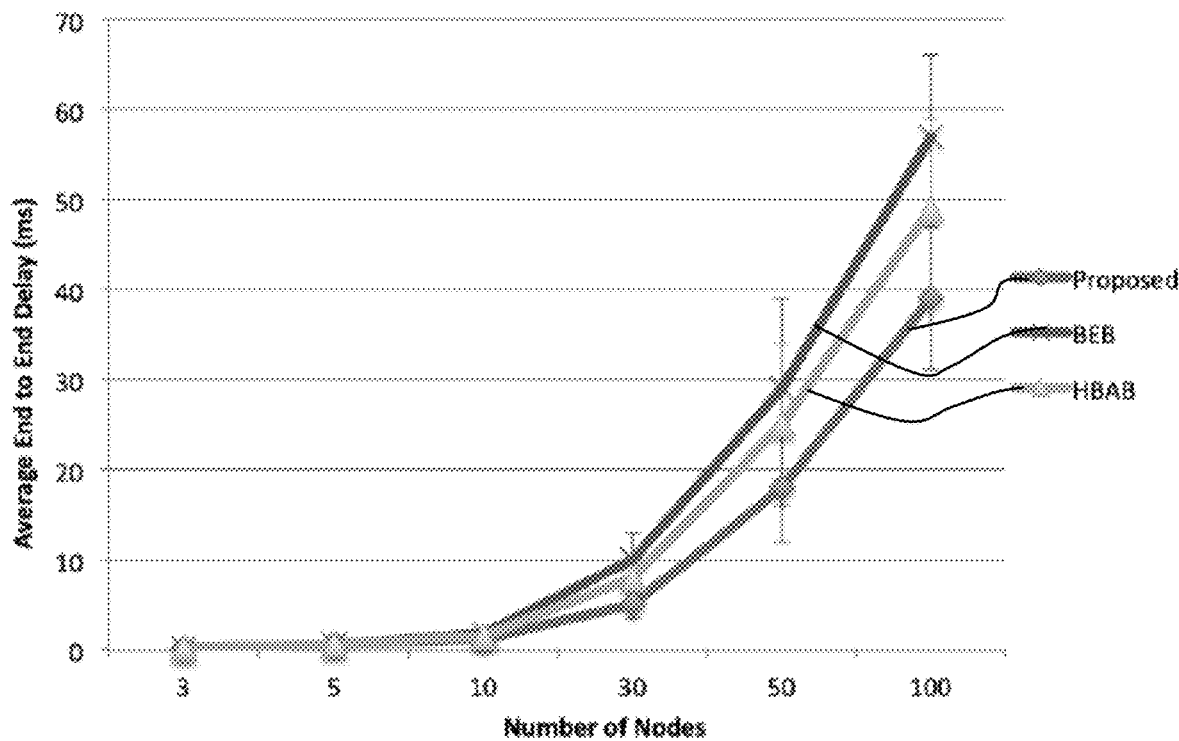

Observed in all traces are similar trends for both average throughput and end-to-end delay. In each plot, a trace for the experimental embodiment is labeled "Proposed." FIG. 4A and FIG. 4B are plots that compare example average throughput and delay, respectively, as a function of number of senders for hot-spot traffic trace in infrastructure-based scenario, according to an embodiment. FIG. 5A and FIG. 5B are plots that compare example average throughput and delay, respectively, as a function of the number of senders for company campus traffic trace in infrastructure-based scenario, according to an embodiment. As expected, average throughput decreases, and end-to-end delay increases, as the number of senders increases. For lower number of senders, e.g., 3 and 5, all three algorithms perform similarly. However, as the number of senders increases, resulting in higher network contention, the experimental embodiment is able to achieve better average throughput and end-to-end delay performance when compared to IEEE 802.11 BEB and HBAB for all three traffic traces (although synthetic results are not plotted to save space).

Table 4 summarizes the throughput and delay improvement achieved by the experimental embodiment when compared to BEB and HBAB for 100 senders in the infrastructure-based scenario for all traffic traces. It is observed that in such more heavily loaded environments, the experimental embodiment is able to achieve significant gains both in throughput (up to 220% over BEB and 92% over HBAB) as well as in end-to-end delay (up to 33% over BEB and up to 21% over HBAB).

TABLE 4

Throughput and delay improvement in infrastructure-based scenario with 100 senders for all traffic traces.

| | Over BEB Throughput | Over HBAB Throughput | Over BEB Delay | Over HBAB Delay |
|---|---|---|---|---|
| Synthetic | 180% | 90% | 28% | 12% |
| Hot-spot | 220% | 92% | 33% | 20% |
| Company | 170% | 64% | 31% | 21% |

In order to evaluate the ability of the experimental embodiment to provide a fair share of the channel to participating stations, Table 5 shows the minimum, average, and maximum throughput reported by stations when using the experimental embodiment compared against BEB and HBAB for the synthetic data trace in the infrastructure-based scenario with 100 senders. Both the difference between the maximum and minimum throughput as well as the standard deviation (also reported in Table 5) show that the experimental embodiment yields superior fairness performance when compared to both BEB and HBAB. As previously discussed, the main reason for less fair channel allocation in BEB is due to the reset of CW to CWmin upon a successful transmission, which gives certain nodes higher chance to seize the channel. HBAB shows fairness improvement over BEB by avoiding immediate reset of CW to CWmin after single successful transmission, but still only considers short term packet transmission history which results in less fair channel allocation when compared to the experimental embodiment. It should be pointed out that BEB is able to yield the highest maximum throughput which is consistent with its resetting of CW to CWmin upon a successful transmission.

TABLE 5

Improved fairness of experimental approached based on better average throughput and smaller throughput variations in infrastructure-based scenario.

| | Minimum throughput (Mbps) | Average throughput (Mbps) | Maximum throughput (Mbps) | Standard deviation throughput (Mbps) |
|---|---|---|---|---|
| Proposed (experimental embodiment) | 0.64 | 1.20 | 1.96 | 0.48 |
| BEB | 0 | 0.51 | 2.12 | 0.89 |
| HBAB | 0 | 0.75 | 1.56 | 0.62 |

Figure 6A:
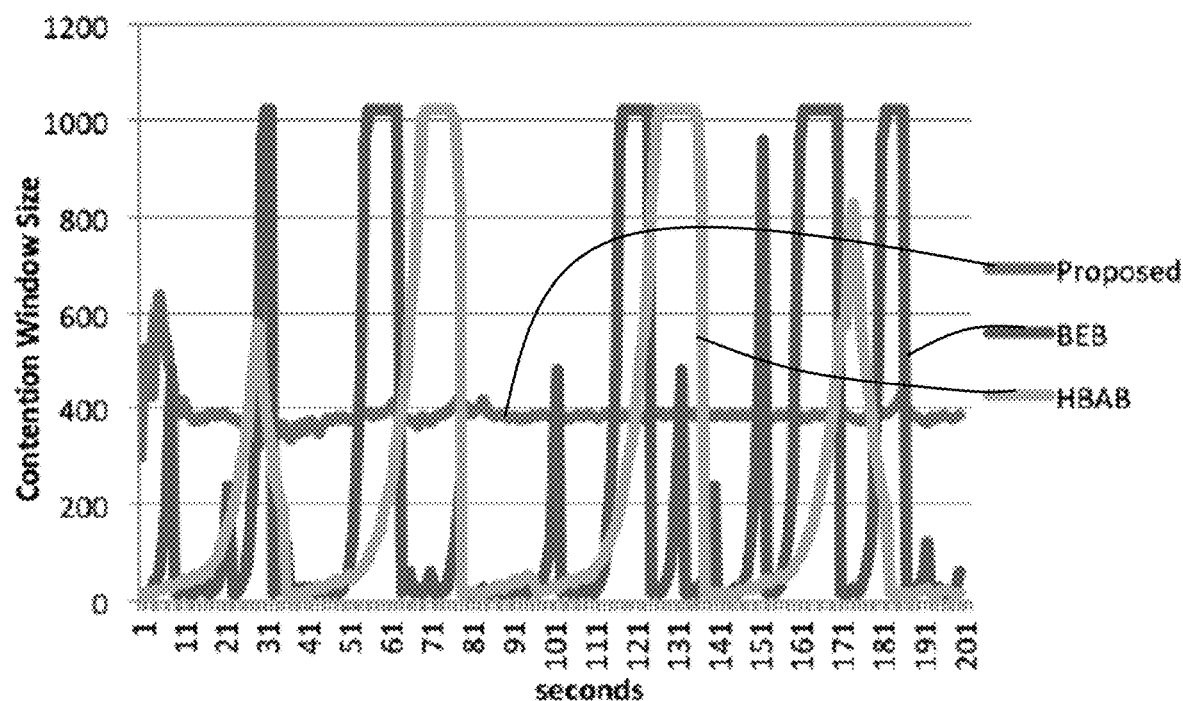
FIG. 6A and FIG. 6B are plots that compare example contention window size variation over time for the two nodes with maximum and minimum throughput, respectively, for synthetic trace in infrastructure-based scenario with 100 senders, according to an embodiment.
Figure 6B:
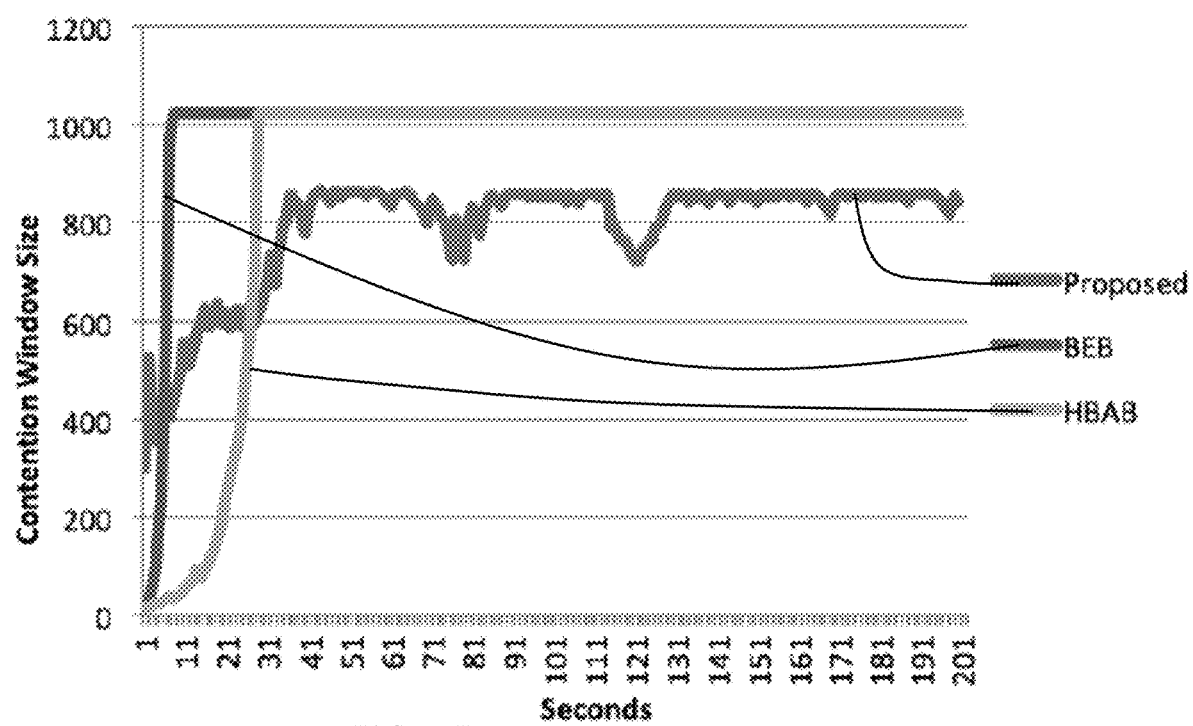

FIG. 6A and FIG. 6B are plots that compare example contention window size variation over time for the nodes with maximum and minimum throughput, respectively, for synthetic trace in infrastructure-based scenario with 100 senders, according to an embodiment. In each plot, a trace for the experimental embodiment is labeled "Proposed." These graphs reinforce the results of Table 5. For both BEB and HBAB, CW for the node that reports the minimum throughput, FIG. 6B, stays practically constant at CWmax for almost the whole experiment. In the case of the maximum throughput node, FIG. 6A, its CW varies considerably between CWmin (15) and CWmax (1023) during the whole run under both BEB and HBAB. According to the experimental embodiment ("Proposed"), the maximum throughput node has a CW that is able to reach a steady state quite fast around 400; and; not too different from the minimum throughput node CW value of about 800.

In FIG. 6A, which shows the CW variation for the node with maximum throughput, significant CW oscillation between CWmin and CWmax is observed under BEB and HBAB. In the case of the experimental embodiment, CW stays fairly constant throughout the experiment. The reason is that, after each successful transmission, the weight of experts with value higher than the current CW is reduced and the weight of experts with a value lower than the current CW is increased. Therefore, for the next transmission, since the applied delay is calculated as the weighted sum of all experts, its value decreases slowly (incrementally). Also, in the case of unsuccessful transmission, the weight of experts with values higher than current CW are increased and the weight of experts with values lower than the current CW are decreased. And again, since the next CW is calculated as the weighted sum of all experts, the next CW is only slightly (incrementally) higher for the next transmission. In other words, through the experts and their weights, the experimental embodiment is able to account for recent past as well as the present transmission performance.

FIG. 6B shows the variation of CW over time for the node with the lowest average throughput in the infrastructure-based scenario with 100 senders using the synthetic traffic trace. As the results in Table 5 indicate, minimum throughput for both BEB and HBAB is 0 which indicates that there are some nodes in the network that suffer from starvation. From FIG. 6B, it is observed that, relatively early in the experiment, CW of the node with the lowest throughput stabilizes at CWmax which considerably decreased the node's chance to acquire the channel, ultimately resulting in "starvation", i.e., zero throughput.

The next figures show performance and fairness for the multi-hop ad hoc experiments, in which randomly selected senders send data traffic to randomly selected receivers according to the three traffic traces described in Table 4. Similarly to the infrastructure-based experiments, the number of senders vary as follows: 3, 5, 10, 30, 50, and 100.

Figure 7A:
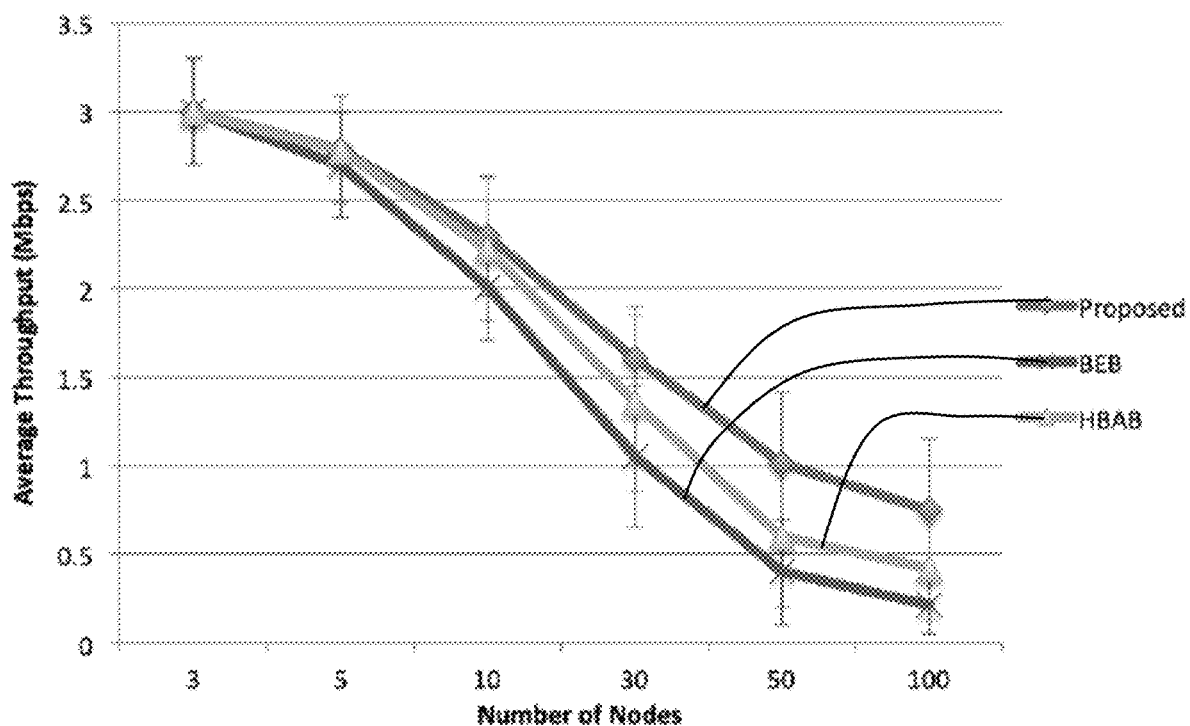
FIG. 7A and FIG. 7B are plots that compare example average throughput and delay, respectively, as a function of the number of senders for hot-spot data in ad hoc scenarios, according to an embodiment.
Figure 7B:
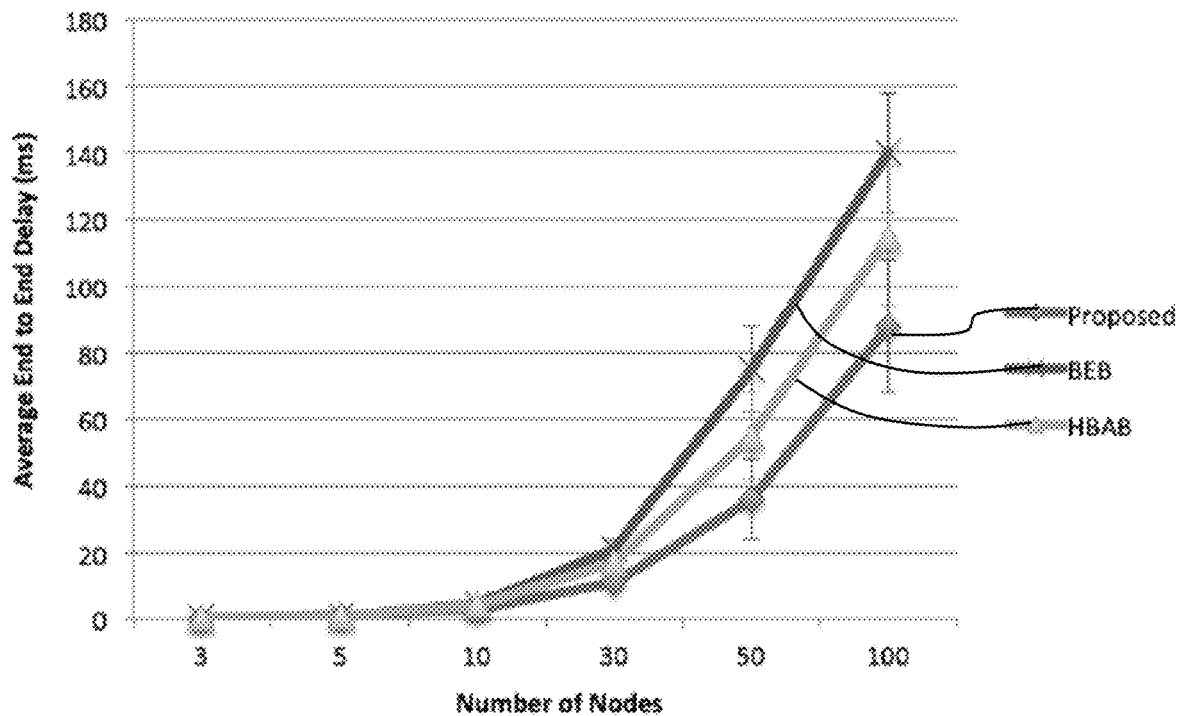
Figure 8A:
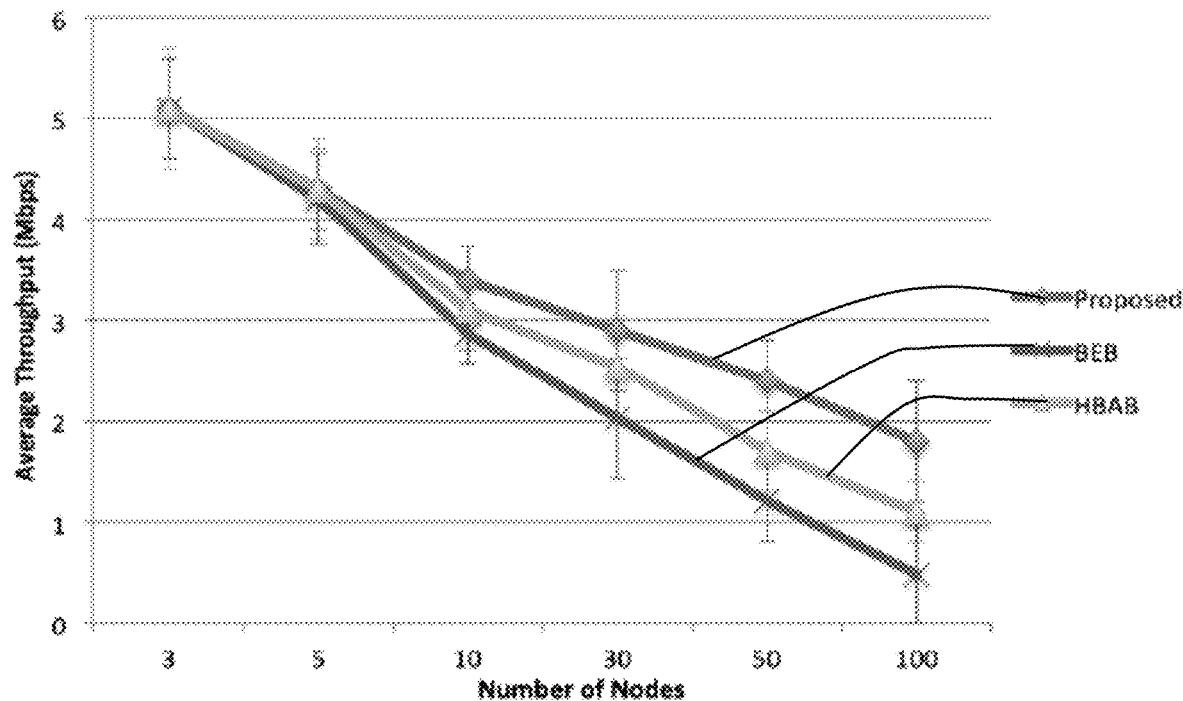
FIG. 8A and FIG. 8B are plots that compare example average throughput and delay, respectively, as a function of the number of nodes for company data in ad hoc scenarios, according to an embodiment.
Figure 8B:
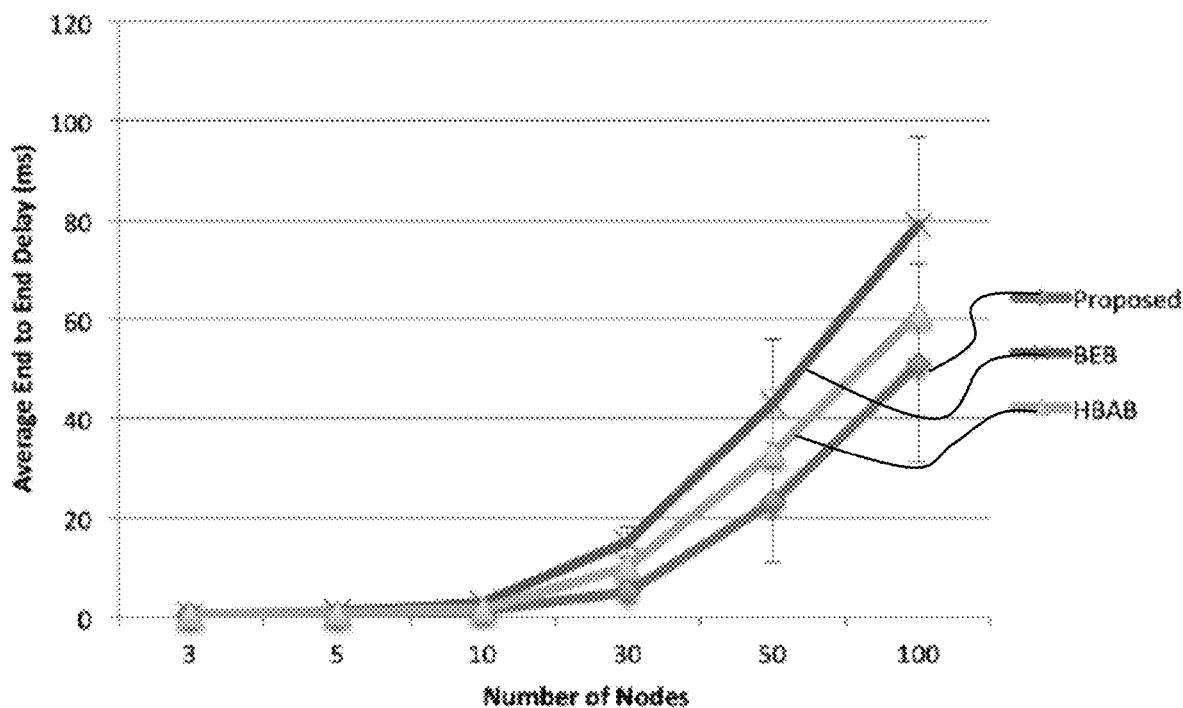

The average throughput and end-to-end delay of the experimental embodiment are compared with those of BEB and HBAB for different number of senders and traffic traces in the ad hoc scenario. FIG. 7A and FIG. 7B are plots that compare example average throughput and delay, respectively, as a function of the number of senders for hot-spot data in ad hoc scenarios, according to an embodiment. FIG. 8A and FIG. 8B are plots that compare example average throughput and delay, respectively, as a function of the number of nodes for company data in ad hoc scenarios, according to an embodiment. In each plot, a trace for the experimental embodiment is labeled "Proposed." Similarly to the trend reported in the infrastructure-based experiments, it is observed that, for lower number of senders, all three methods perform similarly. However, when the number of senders increase, which result in higher network contention, the experimental embodiment is able to achieve higher average throughput and lower average end-to-end delay when compared to both BEB and HBAB. Similarly to the infrastructure-based experiments, average throughput and end-to-end delay results are not plotted for the synthetic dataset to save space.

Table 6 summarizes the throughput and delay improvement achieved by experimental embodiment when compared to those of BEB and HBAB for 100 senders in the ad hoc scenario for all traffic traces. Similarly to what was observed for the infrastructure-based experiment, in high contention networks, the experimental embodiment yields significant improvement both in average throughput (up to 257% over BEB and 78% over HBAB) and average end-to-end delay (up to 37% over BEB and 23% over HBAB).

TABLE 6

Throughput and delay improvement in ad hoc scenario with 100 senders for all traffic traces.

| | Over BEB Throughput | Over HBAB Throughput | Over BEB Delay | Over HBAB Delay |
|---|---|---|---|---|
| Synthetic | 230% | 75% | 31% | 21% |
| Hot spot | 240% | 78% | 37% | 23% |
| Company | 257% | 63% | 35% | 17% |

To evaluate fairness of the experimental embodiment in ad hoc scenarios, the minimum, average, and maximum throughput for the synthetic traffic trace with 100 senders are listed in Table 7. Like the results reported for the infrastructure-based experiments, the experimental embodiment is able to reduce the gap between the minimum and maximum average throughput with a lower standard deviation, an indication of its ability to deliver improved fairness when compared to BEB and HAB.

TABLE 7

Improved fairness of experimental approached based on better average throughput and smaller throughput variations in ad hoc scenario.

|  | Minimum throughput (Mbps) | Average throughput (Mbps) | Maximum throughput (Mbps) | Standard deviation throughput (Mbps) |
|---|---|---|---|---|
| Proposed (experimental embodiment) | 0.43 | 1.05 | 1.6 | 0.41 |
| BEB | 0.00 | 0.30 | 1.8 | 0.75 |
| HBAB | 0.00 | 0.60 | 1.2 | 0.52 |

Figure 9A:
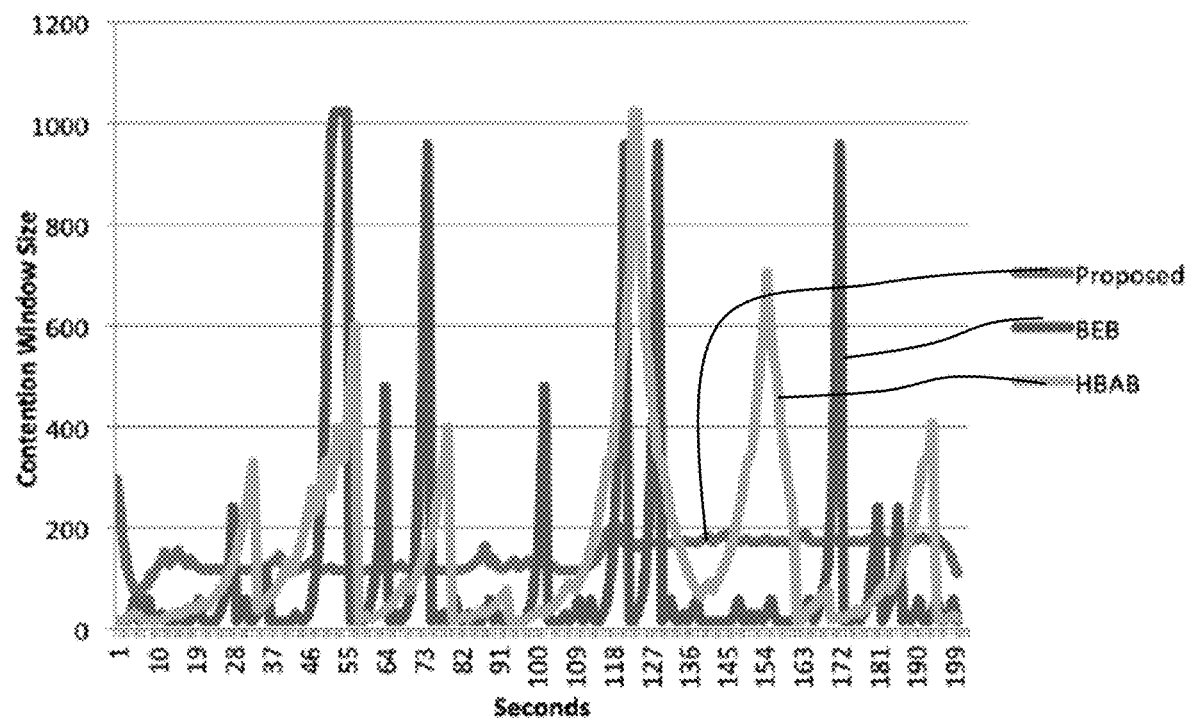
FIG. 9A and FIG. 9B are plots that compare example contention window size variation over time for the nodes with maximum and minimum throughput, respectively, for synthetic trace in ad hoc scenario with 100 senders, according to an embodiment.
Figure 9B:
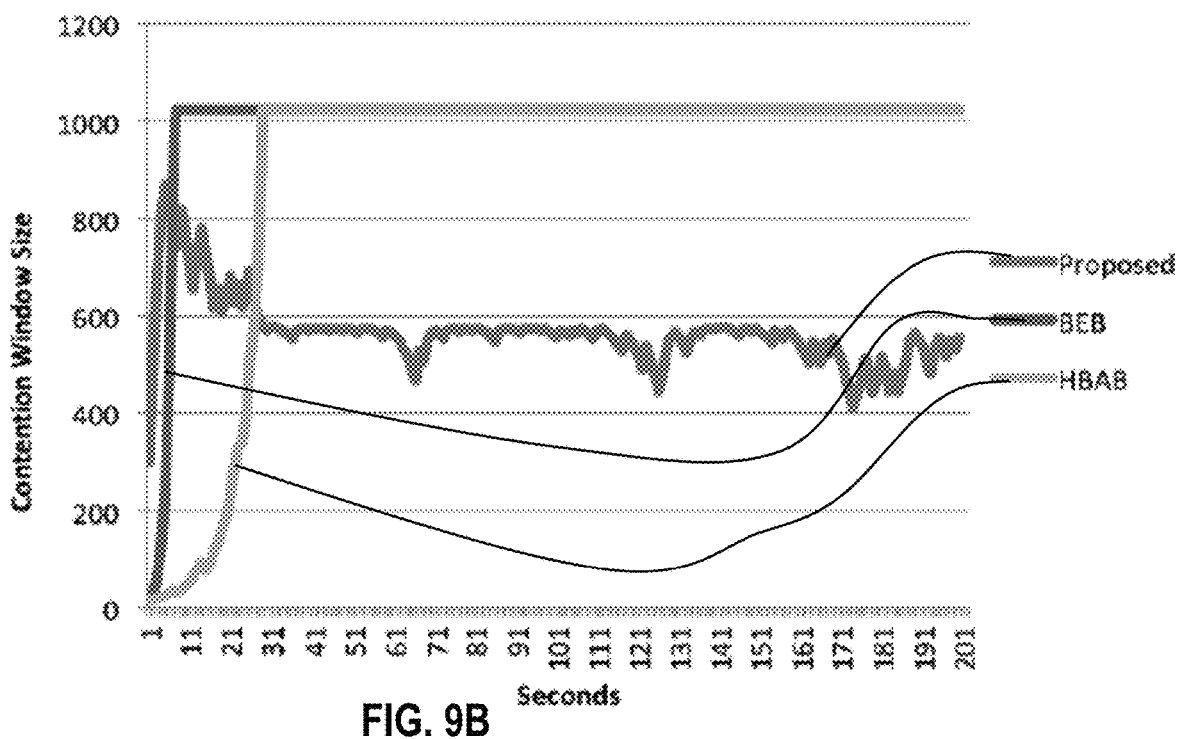

FIG. 9A and FIG. 9B are plots that compare example contention window size variation over time for the nodes with maximum and minimum throughput, respectively, for synthetic trace in ad hoc scenario with 100 senders, according to an embodiment. In each plot, a trace for the experimental embodiment is labeled "Proposed." These plots show CW variation over time for both the nodes that yield the maximum and minimum average throughput under the experimental embodiment as well as under BEB and HBAB in the ad hoc scenario with 100 senders using the synthetic traffic trace. Like the trend observed in the infrastructure-based experiments, the experimental embodiment (Proposed trace) is able to achieve steady state relatively quickly for both the nodes with maximum, and with minimum, throughput. The plots also show that the experimental embodiment is able to close the gap between the CWs of the highest throughput node and the lowest throughput node, which is another indication of improved fairness.

This section has described a simple, yet effective machine learning embodiment to adjust the value of an IEEE 802.11 Contention Window based on present, as well as recent past, network contention conditions. Using a wide range of network scenarios and conditions, it is shown that the experimental embodiment outperforms both the 802.11 BEB as well as an existing contention window adjustment technique that only considers the last two transmissions. These results indicate that the experimental embodiment is able to deliver consistently higher average throughput, lower end-to-end delay, as well as improved fairness.

3. Hardware Overview

Figure 10:
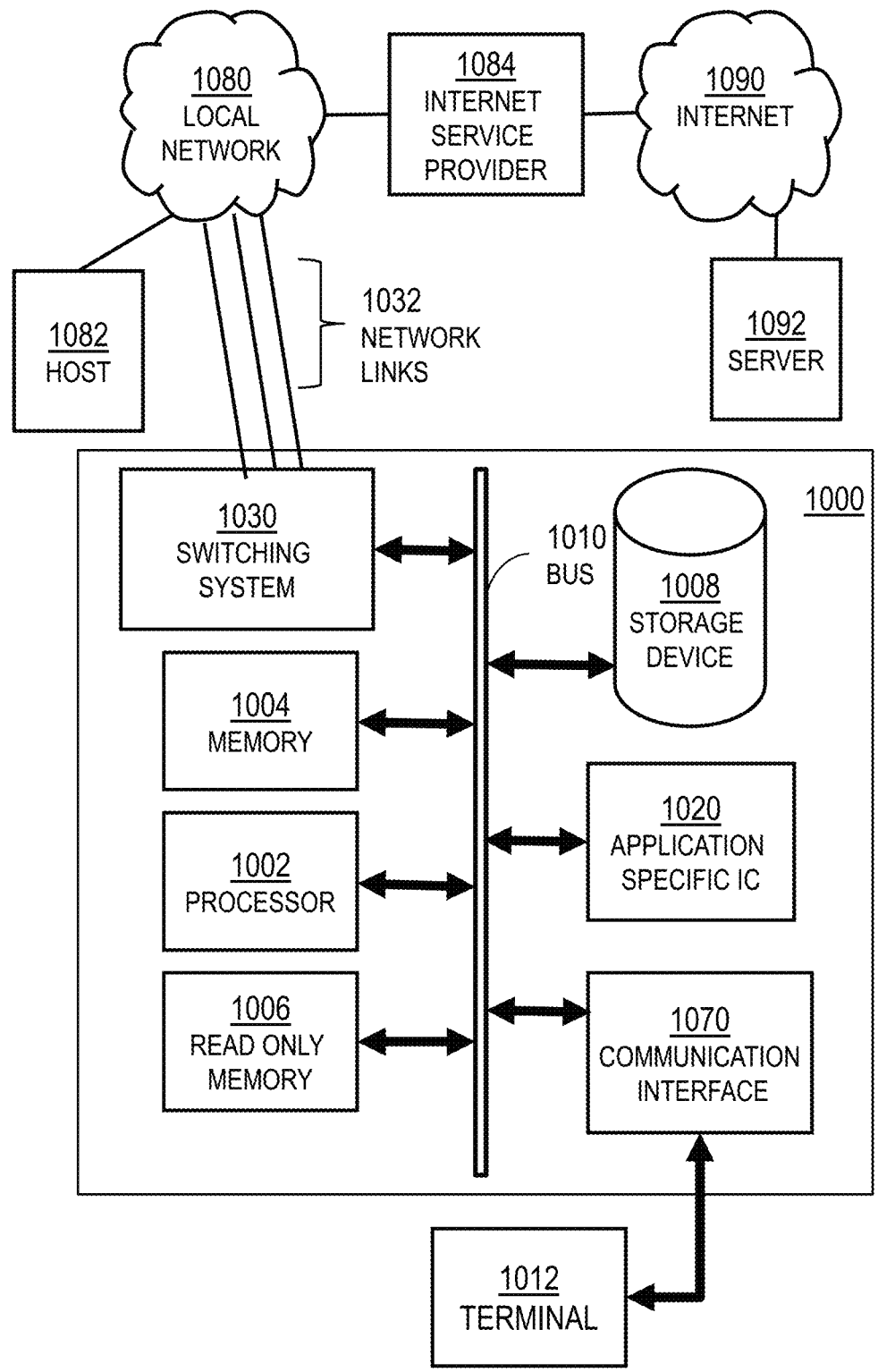
FIG. 10 is a block diagram that illustrates a networking computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random-access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk, optical disk, or FLASH-EPROM, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1000 includes switching system 1030 as special purpose hardware for switching information flow over a network. Switching system 1030 typically includes multiple communications interfaces, such as communications interface 1070, for coupling to multiple other devices. In general, each coupling is with a network link 1032 that is connected to another device in or attached to a network, such as local network 1080 in the illustrated embodiment, to which a variety of external devices with their own processors are connected. In some embodiments an input interface or an output interface or both are linked to each of one or more external network elements. Although three network links 1032a, 1032b, 1032c are included in network links 1032 in the illustrated embodiment, in other embodiments, more or fewer links are connected to switching system 1030. Network links 1032 typically provides information communication through one or more networks to other devices that use or process the information. For example, network link 1032b may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides routing information for use with switching system 1030.

The switching system 1030 includes logic and circuitry configured to perform switching functions associated with passing information among elements of network 1080, including passing information received along one network link, e.g. 1032a, as output on the same or different network link, e.g., 1032c. The switching system 1030 switches information traffic arriving on an input interface to an output interface according to pre-determined protocols and conventions that are well known. In some embodiments, switching system 1030 includes its own processor and memory to perform some of the switching functions in software. In some embodiments, switching system 1030 relies on processor 1002, memory 1004, ROM 1006, storage 1008, or some combination, to perform one or more switching functions in software. For example, switching system 1030, in cooperation with processor 1004 implementing a particular protocol, can determine a destination of a packet of data arriving on input interface on link 1032a and send it to the correct destination using output interface on link 1032c. The destinations may include host 1082, server 1092, other terminal devices connected to local network 1080 or Internet 1090, or other routing and switching devices in local network 1080 or Internet 1090.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general, the coupling is with a network link 1032 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated service digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. As another example, communications interface 1070 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1032 typically provides information communication through one or more networks to other devices that use or process the information. For example, network link 1032 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1032 and other networks through communications interface 1070, carry information to and from computer system 1000. Computer system 1000 can send and receive information, including program code, through the networks 1080, 1090 among others, through network link 1032 and communications interface 1070. In an example using the Internet 1090, a server 1092 transmits program code for an application, requested by a message sent from computer 1000, through Internet 1090, ISP equipment 1084, local network 1080 and communications interface 1070. The received code may be executed by processor 1002 as it is received or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1032. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

4. Alternatives, Extensions, Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

5. References

The following references are hereby incorporated by reference as if fully cited herein, except for terminology inconsistent with that used herein.

[1] Maali Albalt and Qassim Nasir. 2009. Adaptive backoff algorithm for IEEE 802.11 MAC protocol. International Journal of Communications, Network and System Sciences 2, 04 (2009), 300.

[2] Khaled Hatem Almotairi. 2013. Inverse binary exponential backoff: Enhancing short-term fairness for IEEE 802.11 networks. In ISWCS 2013; The Tenth International Symposium on Wireless Communication Systems. VDE, 1-5.

[3] Vaduvur Bharghavan, Alan Demers, Scott Shenker, and Lixia Zhang. 1994. MACAW: a media access protocol for wireless LAN's. ACM SIGCOMM Computer Communication Review 24, 4 (1994), 212-225.

[4] Gustavo Carneiro. 2010. NS-3: Network simulator 3. In UTM Lab Meeting April, Vol. 20. 4-5.

[5] Yalda Edalat, Jong-Suk Ahn, and Katia Obraczka. 2016. Smart experts for network state estimation. IEEE Transactions on Network and Service Management 13, 3 (2016), 622-635.

[6] Yalda Edalat, Katia Obraczka, and Bahador Amiri. 2018. A machine learning approach for dynamic control of RTS/CTS in WLANs. In Proceedings of the 15th EAI International Conference on Mobile and Ubiquitous Systems: Computing, Networking and Services. ACM, 432-442.

[7] Lassaad Gannoune. 2006. A Non-linear Dynamic Tuning of the Minimum Contention Window (CW min) for Enhanced Service Differentiation in IEEE 802.11 ad-hoc Networks. In 2006 IEEE 63rd Vehicular Technology Conference, Vol. 3. IEEE, 1266-1271.

[8] David P Helmbold, Darrell D E Long, Tracey L Sconyers, and Bruce Sherrod. 2000. Adaptive disk spin-down for mobile computers. Mobile Networks and Applications 5, 4 (2000), 285-297.

[9] Mark Herbster and Manfred K Warmuth. 1998. Tracking the best expert. Machine learning 32, 2 (1998), 151-178.

[10] Hyung Joo Ki, Seung-Hyuk Choi, Min Young Chung, and Tae-Jin Lee. 2006, IEEE 802.11 WLAN. In International Conference on Mobile Ad-Hoc and Sensor Networks. Springer, 294-303.

[11] Adlen Ksentini, Abdelhamid Nafaa, Abdelhak Gueroui, and Mohamed Naimi. 2005. Determinist contention window algorithm for IEEE 802.11. In 2005 IEEE 16th International Symposium on Personal, Indoor and Mobile Radio Communications, Vol. 4. IEEE, 2712-2716.

[12] Bruno Astuto Arouche Nunes, Kerry Veenstra, William Ballenthin, Stephanie Lukin, and Katia Obraczka. 2014. A machine learning framework for TCP roundtrip time estimation. EURASIP Journal on Wireless Communications and Networking 2014, 1 (2014), 47.

[13] Charles Perkins, Elizabeth Belding-Royer, and Samir Das. 2003. Ad hoc on-demand distance vector (AODV) routing. Technical Report.

[14] Mohammad Shurman, Bilal Al-Shua'b, Mohammad Alsaedeen, Mamoun F Al-Mistarihi, and Khalid A Darabkh. 2014. N-BEB: New backoff algorithm for IEEE 802.11 MAC protocol. In 2014 37th International Convention on Information and Communication Technology, Electronics and Microelectronics (MIPRO). IEEE, 540-544.

What is claimed is:

1. A method for avoiding packet collisions in a communications network, the method comprising:
    initializing first data indicating a plurality of fixed delay values in a range from a minimum delay to a maximum delay and indicating a corresponding plurality of adjustable weights;
    determining a first applied delay for a first packet based on the first data;
    transmitting the first packet at a time based on the first applied delay; and
    adjusting the first data by adjusting at least one weight of the first data based on whether transmission of the first packet was successful.

2. The method as recited in claim 1, further comprising:
    determining a second applied delay for a second packet based on the adjusted first data; and
    transmitting the second packet at a time based on the second applied delay.

3. The method as recited in claim 1, said adjusting the first data further comprises adjusting the first data to incrementally promote shorter delay times when transmission of the first packet is successful or incrementally promote longer delay times when transmission of the first packet is not successful or both, whereby recent past transmission performance influences an applied delay.

4. The method as recited in claim 1, wherein each of the plurality of adjustable weights indicates a probability of selecting a corresponding fixed delay time of the plurality of fixed delay times, or a delay applied is a weighted sum the plurality of fixed delay times each weighted by its corresponding weight.

5. The method as recited in claim 4, said adjusting the first data further comprising, when the transmission is successful:
    reducing a first weight of the plurality of adjustable weights for a corresponding first fixed delay value greater than the first applied delay; or
    increasing a second weight of the plurality of adjustable weights for a corresponding second fixed delay value smaller than the first applied delay; or
    both.

6. The method as recited in claim 5, wherein:
    reducing the first weight further comprises reducing the first weight proportionally to a difference between the first applied delay and the first fixed value; and
    increasing the second weight further comprises increasing the second weight proportionally to a difference between the first applied delay and the second fixed value.

7. The method as recited in claim 4, said adjusting the first data further comprising, when the transmission is unsuccessful:
    increasing a first weight of the plurality of adjustable weights for a corresponding first fixed value greater than the first applied delay, or
    decreasing a second weight of the plurality of adjustable weights for a corresponding second fixed value smaller than the first applied delay, or
    both.

8. The method as recited in claim 7, wherein:
    increasing the first weight further comprises increasing the first weight proportionally to a difference between the first applied delay and the first fixed value; and
    decreasing the second weight further comprises decreasing the second weight proportionally to a difference between the first applied delay and the second fixed value.

9. The method as recited in claim 4, wherein, during said initialization, each weight of the plurality of adjustable weights is equal to a same default weight.

10. The method as recited in claim 9, wherein, the same default weight is an inverse of a number of adjustable weights in the plurality of adjustable weights.

11. The method as recited in claim 1, wherein, the plurality of fixed values forms a geometric sequence.

12. The method as recited in claim 11, wherein the geometric sequence is incremented by a factor of 1.5.

13. The method as recited in claim 1, wherein the plurality of fixed delay values indicate slots for a Distributed Coordination Function used by an IEEE 802.11 (WiFi) standard and the minimum delay is a minimum applied delay and the maximum delay is a maximum applied delay.

14. A non-transitory computer-readable medium carrying one or more sequences of instructions, wherein execution of the one or more sequences of instructions by one or more processors causes the one or more processors to perform the steps of:
    initialize first data indicating a plurality of fixed delay values in a range from a minimum delay to a maximum delay and indicating a corresponding plurality of adjustable weights;
    determine a first applied delay for a first packet based on the first data;
    transmit the first packet at a time based on the first applied delay; and
    adjust the first data by adjusting at least one weight of the first data based on whether transmission of the first packet was successful.

15. The non-transitory computer-readable medium as recited in claim 14, wherein execution of the one or more sequences of instructions further causes the one or more processors to perform the steps of:
    determining a second applied delay for a second packet based on the adjusted first data; and
    transmitting the second packet at a time based on the second applied delay.

16. The non-transitory computer-readable medium as recited in claim 14, said adjusting the first data further comprises adjusting the first data to incrementally promote shorter delay times when transmission of the first packet is successful or incrementally promote longer delay times when transmission of the first packet is not successful or both, whereby recent past transmission performance influences an applied delay.

17. The non-transitory computer-readable medium as recited in claim 14, wherein each of the plurality of adjustable weights indicates a probability of selecting a corresponding fixed delay time of the plurality of fixed delay times, or a delay applied is a weighted sum the plurality of fixed delay times each weighted by its corresponding weight.

18. The non-transitory computer-readable medium as recited in claim 17, said adjusting the first data further comprising, when the transmission is successful:
reducing a first weight of the plurality of adjustable weights for a corresponding first fixed delay value greater than the first applied delay; or
increasing a second weight of the plurality of adjustable weights for a corresponding second fixed delay value smaller than the first applied delay; or
both.

19. The non-transitory computer-readable medium as recited in claim 18, wherein:
reducing the first weight further comprises reducing the first weight proportionally to a difference between the first applied delay and the first fixed value; and
increasing the second weight further comprises increasing the second weight proportionally to a difference between the first applied delay and the second fixed value.

20. The non-transitory computer-readable medium as recited in claim 17, said adjusting the first data further comprising, when the transmission is unsuccessful:
increasing a first weight of the plurality of adjustable weights for a corresponding first fixed value greater than the first applied delay, or
decreasing a second weight of the plurality of adjustable weights for a corresponding second fixed value smaller than the first applied delay, or
both.

21. The non-transitory computer-readable medium as recited in claim 20, wherein:
increasing the first weight further comprises increasing the first weight proportionally to a difference between the first applied delay and the first fixed value; and
decreasing the second weight further comprises decreasing the second weight proportionally to a difference between the first applied delay and the second fixed value.

22. The non-transitory computer-readable medium as recited in claim 14, wherein, the plurality of fixed values forms a geometric sequence.

23. An apparatus comprising:
at least one processor; and
at least one memory including one or more sequences of instructions,
the at least one memory and the one or more sequences of instructions configured to, with the at least one processor, cause the apparatus to perform at least the following,
initialize first data indicating a plurality of fixed delay values in a range from a minimum delay to a maximum delay and indicating a corresponding plurality of adjustable weights;
determine a first applied delay for a first packet based on the first data;
transmit the first packet at a time based on the first applied delay; and
adjust the first data by adjusting at least one weight of the first data based on whether transmission of the first packet was successful.

24. The apparatus as recited in claim 23, wherein the one or more sequences of instructions are further configured to cause the apparatus to perform the steps of:
determining a second applied delay for a second packet based on the adjusted first data; and
transmitting the second packet at a time based on the second applied delay.

25. The apparatus as recited in claim 23, said adjusting the first data further comprises adjusting the first data to incrementally promote shorter delay times when transmission of the first packet is successful or incrementally promote longer delay times when transmission of the first packet is not successful or both, whereby recent past transmission performance influences an applied delay.

26. The apparatus as recited in claim 23, wherein each of the plurality of adjustable weights indicates a probability of selecting a corresponding fixed delay time of the plurality of fixed delay times, or a delay applied is a weighted sum the plurality of fixed delay times each weighted by its corresponding weight.

27. The apparatus as recited in claim 26, said adjusting the first data further comprising, when the transmission is successful:
reducing a first weight of the plurality of adjustable weights for a corresponding first fixed delay value greater than the first applied delay; or
increasing a second weight of the plurality of adjustable weights for a corresponding second fixed delay value smaller than the first applied delay; or
both.

28. The apparatus as recited in claim 27, wherein:
reducing the first weight further comprises reducing the first weight proportionally to a difference between the first applied delay and the first fixed value; and
increasing the second weight further comprises increasing the second weight proportionally to a difference between the first applied delay and the second fixed value.

29. The apparatus as recited in non-transitory computer-readable medium as recited in claim 26, said adjusting the first data further comprising, when the transmission is unsuccessful:
increasing a first weight of the plurality of adjustable weights for a corresponding first fixed value greater than the first applied delay, or
decreasing a second weight of the plurality of adjustable weights for a corresponding second fixed value smaller than the first applied delay, or
both.

30. The apparatus as recited in claim 29, wherein:
increasing the first weight further comprises increasing the first weight proportionally to a difference between the first applied delay and the first fixed value; and
decreasing the second weight further comprises decreasing the second weight proportionally to a difference between the first applied delay and the second fixed value.

31. The apparatus as recited in claim 23, wherein, the plurality of fixed values forms a geometric sequence.

* * * * *